US009249710B2

(12) United States Patent
Mori et al.

(10) Patent No.: US 9,249,710 B2
(45) Date of Patent: Feb. 2, 2016

(54) WORK VEHICLE

(71) Applicant: KOMATSU LTD., Tokyo (JP)

(72) Inventors: Tadashi Mori, Hirakata (JP); Jin Yogita, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/354,943

(22) PCT Filed: Jan. 14, 2014

(86) PCT No.: PCT/JP2014/050427
§ 371 (c)(1),
(2) Date: Apr. 29, 2014

(87) PCT Pub. No.: WO2014/192320
PCT Pub. Date: Dec. 4, 2014

(65) Prior Publication Data
US 2015/0198074 A1 Jul. 16, 2015

(51) Int. Cl.
F01N 3/00 (2006.01)
F01N 3/10 (2006.01)
(Continued)

(52) U.S. Cl.
CPC .............. F01N 3/2066 (2013.01); F01N 3/021 (2013.01); F01N 3/2006 (2013.01); F01N 3/208 (2013.01); F01N 13/1805 (2013.01); F02D 41/042 (2013.01); F02D 41/2403 (2013.01); E02F 9/0866 (2013.01); E02F 9/268 (2013.01); F01N 2240/20 (2013.01); F01N 2340/04 (2013.01); F01N 2550/05 (2013.01); F01N 2560/06 (2013.01); F01N 2610/02 (2013.01); F01N 2610/11 (2013.01); F01N 2610/146 (2013.01); F01N 2610/1453 (2013.01); F01N 2610/1473 (2013.01); F02D 29/04 (2013.01); F02D 2041/228 (2013.01); Y02T 10/47 (2013.01)

(58) Field of Classification Search
CPC ... F01N 3/2066; F01N 3/208; F01N 2550/05; F01N 2610/02; F01N 2610/11; F01N 2610/146
USPC .................... 60/277, 295, 297, 301, 303, 311
See application file for complete search history.

(56) References Cited

U.S. PATENT DOCUMENTS 5,976,475 A 11/1999 Peter-Hoblyn et al.
6,063,350 A 5/2000 Tarabulski et al.
(Continued)

FOREIGN PATENT DOCUMENTS

| CN | 101512113 A | 8/2009 |
| CN | 103261602 A | 8/2013 |
| DE | 69831661 T2 | 5/2006 |
| JP | H11-101172 A | 4/1999 |
| JP | 2012-137037 A | 7/2012 |

Primary Examiner — Audrey K Bradley
(74) Attorney, Agent, or Firm — Drinker Biddle & Reath LLP

(57) ABSTRACT

A work vehicle includes an engine, an injector injecting a reducing agent to an exhaust gas exhausted from the engine, a determination portion determining whether or not a temperature of the injector is high, a stop determination portion determining whether or not the engine has stopped while the injector is in a high-temperature state as a result of determination by the determination portion, a counter counting the number of times of stop of the engine while the injector is in the high-temperature state based on a result of determination by the stop determination portion, and a warning portion giving a warning in connection with stop of the engine when a count value of the counter exceeds a first prescribed value.

14 Claims, 15 Drawing Sheets

(51) Int. Cl.
*F01N 3/02* (2006.01)
*F01N 3/20* (2006.01)
*F02D 41/04* (2006.01)
*F01N 13/18* (2010.01)
*F01N 3/021* (2006.01)
*F02D 41/24* (2006.01)
*F02D 41/22* (2006.01)
*E02F 9/08* (2006.01)
*E02F 9/26* (2006.01)
*F02D 29/04* (2006.01)

(56) References Cited

U.S. PATENT DOCUMENTS

| | | |
|---|---|---|
| 6,068,528 A | 5/2000 | Suzuki |
| 2010/0154385 A1* | 6/2010 | Perrin et al. ............. 60/274 |
| 2012/0000187 A1* | 1/2012 | Mullins et al. ............ 60/277 |
| 2012/0159928 A1* | 6/2012 | Liu et al. ............... 60/274 |
| 2013/0283769 A1 | 10/2013 | Watanabe et al. |
| 2014/0260199 A1* | 9/2014 | Grzesiak et al. ........... 60/274 |

FOREIGN PATENT DOCUMENTS

* cited by examiner

WORK VEHICLE

TECHNICAL FIELD

The present invention relates to a work vehicle and particularly to an exhaust treatment apparatus.

BACKGROUND ART

An exhaust treatment apparatus is mounted on such a work vehicle as a hydraulic excavator, a bulldozer, and a wheel loader. As the exhaust treatment apparatus, for example, a diesel particulate filter apparatus (DPF), a diesel oxidation catalyst apparatus (DOC), a selective catalytic reduction apparatus (SCR), and the like are available.

In this regard, in an exhaust gas guided to the selective catalytic reduction apparatus (SCR), a reducing agent is injected from a reducing agent injector in advance and mixed.

Since a temperature of the exhaust gas is high, a temperature of the reducing agent injector may also increase. In order to suppress increase in temperature, a coolant is commonly circulated for cooling.

A coolant, however, is supplied by a cooling pump with the use of engine output, and circulation stops as the engine stops. If the engine stops while the reducing agent injector is in a high-temperature state, a cooling function may not effectively be exhibited.

Japanese Patent Laying-Open No. 2012-137037 proposes a scheme for giving notification to prevent an engine from stopping when solidification of a reducing agent is likely because of a possibility of solidification of the reducing agent around an injection valve due to heat and resultant clogging in case of engine stop while a reducing agent injector is in a high-temperature state.

CITATION LIST

Patent Document

PTD 1: Japanese Patent Laying-Open No. 2012-137037

SUMMARY OF INVENTION

Technical Problem

In a case that the engine stops while the reducing agent injector is in the high-temperature state, thermal load is imposed also on the reducing agent injector itself. A life of the reducing agent injector may thus be affected. The scheme in the publication above was a scheme for giving notification each time solidification of a reducing agent depending on a high-temperature state is likely, and it was insufficient in terms of grasping a degree of thermal load imposed on the reducing agent injector.

The present invention was made in order to solve the problems as described above, and an object of the present invention is to provide a work vehicle capable of accurately grasping a degree of thermal load imposed on a reducing agent injector and protecting devices in the reducing agent injector.

Other tasks and novel features will become apparent from the description herein and the attached drawings.

Solution to Problem

A work vehicle according to one aspect of the present invention includes an engine, an injector injecting a reducing agent to an exhaust gas exhausted from the engine, a determination portion determining whether or not a temperature of the injector is high, a stop determination portion determining whether or not the engine has stopped when the injector is determined to be in a high-temperature state as a result of determination by the determination portion, a counter counting the number of times of stop of the engine when the injector is determined to be in the high-temperature state based on a result of determination by the stop determination portion, and a warning portion giving a warning in connection with stop of the engine when a count value of the counter exceeds a first prescribed value.

According to the work vehicle in the present invention, the number of times of stop of the engine is counted based on whether or not the engine has stopped while a temperature of the injector injecting the reducing agent is high. Then, when a count value of the counter exceeds a first prescribed value, a warning is given. Thus, a warning is given as the number of times of stop of the engine is counted while the injector is in the high-temperature state so that a degree of load on the injector is accurately grasped. Therefore, devices in the injector can be protected.

Preferably, a collection apparatus collecting a particulate matter, which is provided upstream of the injector, is further included, and the determination portion determines whether or not the injector is in the high-temperature state based on at least any one of a temperature of the exhaust gas which has passed through the collection apparatus and a temperature of the injector.

According to the above, whether or not the injector is in the high-temperature state is determined based on at least any one of a temperature of the exhaust gas and a temperature of the injector. Therefore, whether or not the injector is in the high-temperature state can directly or indirectly be determined.

Preferably, a cooling apparatus for cooling the injector during operation of the engine and a stop prohibition portion prohibiting stop of the engine when the determination portion determines that the injector is in the high-temperature state when the count value of the counter exceeds a second prescribed value greater than the first prescribed value are further included.

According to the above, by prohibiting stop of the engine when the injector is in the high-temperature state when the counter exceeds a second prescribed value, cooling of the injector can be maintained and hence devices in the injector can be protected.

Preferably, a cooling apparatus for cooling the injector during operation of the engine and an idle reduction execution portion capable of stopping the engine in an idling state are further included, and the idle reduction execution portion does not stop the engine in the idling state when the determination portion determines that the injector is in the high-temperature state when the counter exceeds a second prescribed value greater than the first prescribed value.

According to the above, when the injector is in the high-temperature state owing to the determination portion when the counter exceeds a second prescribed value, stop of the engine by the idle reduction execution portion is prohibited, so that cooling of the injector can be maintained and thus devices in the injector can be protected.

Preferably, the cooling apparatus operates based on motive power from the engine.

According to the above, since the cooling apparatus operates based on motive power from the engine, the cooling apparatus can readily be controlled in coordination with the engine.

Preferably, a communication portion transmitting information on the counter to an external apparatus provided to be able to communicate with the work vehicle is further included. According to the above, since the communication portion transmitting information on the counter is provided, the information on the counter can externally be managed and the information can be made use of for protection of devices in the injector.

Preferably, the warning portion gives the warning when the engine starts.

According to the above, by giving a warning at the time of start of the engine, the warning can effectively be given.

Advantageous Effects of Invention

A degree of load on the reducing agent injector can accurately be grasped and devices in the reducing agent injector can be protected.

DESCRIPTION OF EMBODIMENTS

An embodiment of the present invention will be described hereinafter with reference to the drawings.

First Embodiment

<Overall Construction>

Figure 1:
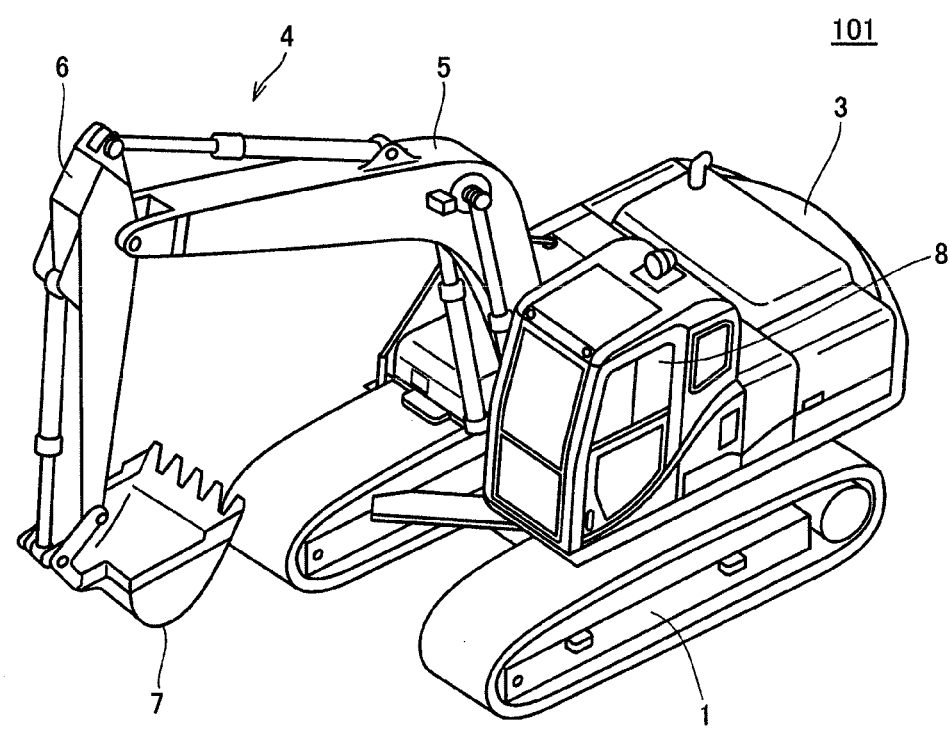
FIG. 1 is a diagram illustrating appearance of a work vehicle 101 based on a first embodiment.

FIG. 1 is a diagram illustrating appearance of a work vehicle 101 based on a first embodiment.

As shown in FIG. 1, in the present example, a hydraulic excavator will mainly be described by way of example as work vehicle 101 based on the first embodiment.

Work vehicle 101 mainly includes a lower carrier 1, an upper revolving unit 3, and a work implement 4. A work vehicle main body is constituted of lower carrier 1 and upper revolving unit 3. Lower carrier 1 has a pair of left and right crawler belts. Upper revolving unit 3 is revolvably attached, with a revolving mechanism above lower carrier 1 being interposed.

Work implement 4 is pivotably supported by upper revolving unit 3 in a manner operable in a vertical direction and performs such working as excavation of soil. Work implement 4 includes a boom 5, an arm 6, and a bucket 7. Boom 5 has a root portion movably coupled to upper revolving unit 3. Arm 6 is movably coupled to a tip end of boom 5. Bucket 7 is movably coupled to a tip end of arm 6. In addition, upper revolving unit 3 includes an operator's cab 8 or the like.

<Construction of Operator's Cab>

Figure 2:
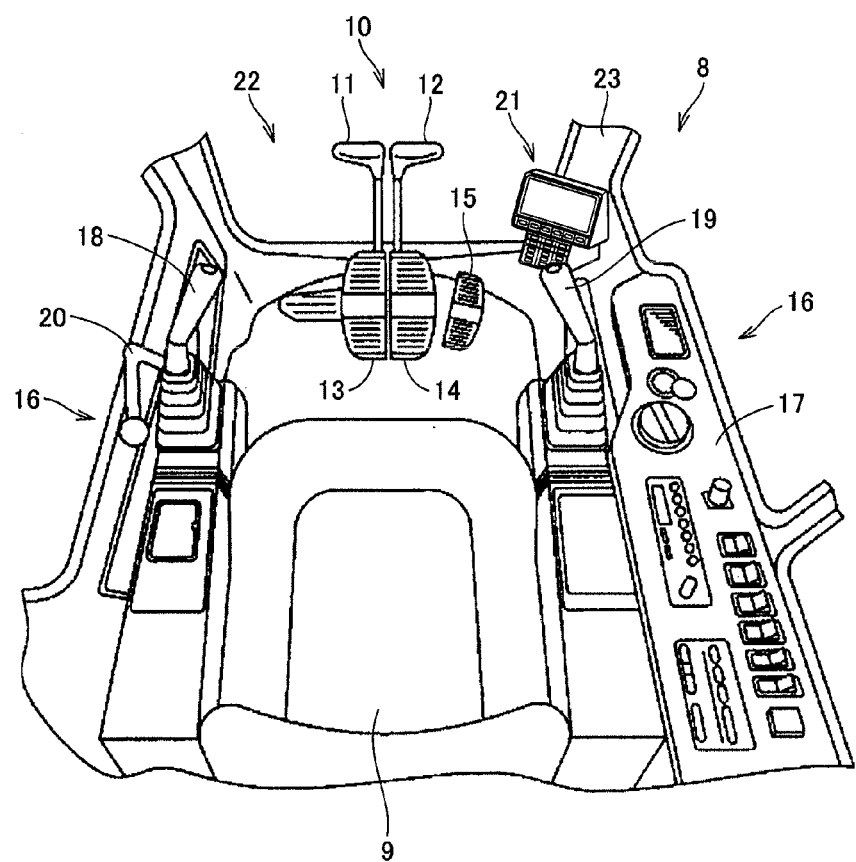
FIG. 2 is a perspective view showing an internal construction of an operator's cab 8 based on the first embodiment.

FIG. 2 is a perspective view showing an internal construction of operator's cab 8 based on the first embodiment.

As shown in FIG. 2, operator's cab 8 has an operator's seat 9, a travel operation portion 10, a pedal for attachment 15, a side window 16, a dashboard 17, work implement levers 18, 19, a locking lever 20, a monitor apparatus 21, a front window 22, and a vertical frame 23.

Operator's seat 9 is provided in a central portion of operator's cab 8. Travel operation portion 10 is provided in front of operator's seat 9.

Travel operation portion 10 includes travel levers 11, 12 and travel pedals 13, 14. Travel pedals 13, 14 can move together with respective travel levers 11, 12. Lower carrier 1 moves forward as the operator pushes forward travel lever 11, 12. Alternatively, lower carrier 1 moves backward as the operator pulls backward travel lever 11, 12.

Pedal for attachment 15 is provided in the vicinity of travel operation portion 10. In addition, dashboard 17 is provided in the vicinity of right side window 16 in FIG. 2.

Work implement levers 18, 19 are provided in left and right portions of operator's seat 9, respectively. Work implement lever 18, 19 serves to carry out vertical movement of boom 5, pivot of arm 6 and bucket 7, a revolving operation of upper revolving unit 3, and the like.

Locking lever 20 is provided in the vicinity of work implement lever 18. Here, locking lever 20 serves to stop such functions as operation of work implement 4, revolution of upper revolving unit 3, and travel of lower carrier 1. By performing an operation for positioning locking lever 20 in a vertical state (here, an operation for pulling down the locking lever), movement of work implement 4 or the like can be locked (restricted). In a state where locking lever 20 has locked movement of work implement 4 or the like, work implement 4 or the like does not operate in spite of an operation of work implement lever 18, 19 by the operator. In addition, similarly, even though travel lever 11, 12 and travel pedal 13, 14 are operated, lower carrier 1 does not operate. On the other hand, by performing an operation for positioning locking lever 20 in a horizontal state (here, an operation for pulling up the locking lever), movement of work implement 4 or the like can be unlocked (not restricted). Thus, work implement 4 or the like can operate.

Monitor apparatus 21 is provided in a lower portion of vertical frame 23 which is a partition between front window 2 and one side window 16 of operator's cab 8 and it displays an engine state of work vehicle 101, guidance information, warning information, or the like. In addition, monitor apparatus 21 is provided to be able to accept a setting instruction as to various operations of work vehicle 101.

Here, an engine state refers, for example, to a temperature of an engine coolant, a temperature of hydraulic oil, an amount of remaining fuel, and the like. Guidance information includes an indication and the like inviting check and maintenance of the engine of the work vehicle, by way of example. Various operations refer to setting of an operation mode, setting in connection with idle reduction control, and the like. Warning information is information to which operator's attention should be called.

<Configuration of Control System>

Figure 3:
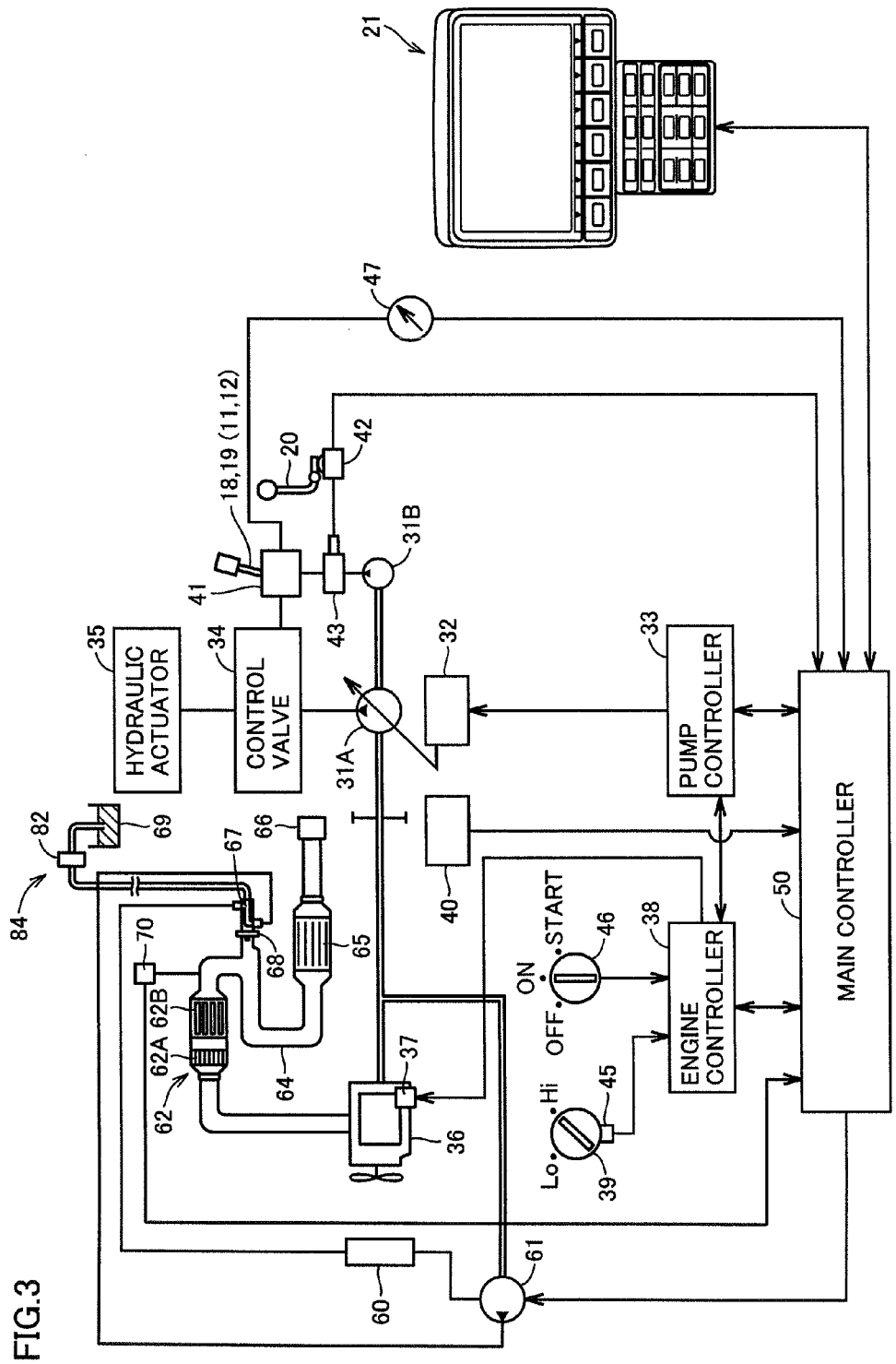
FIG. 3 is a simplified diagram showing a configuration of a control system of work vehicle 101 based on the first embodiment.

FIG. 3 is a simplified diagram showing a configuration of a control system of work vehicle 101 based on the first embodiment.

As shown in FIG. 3, the control system of work vehicle 101 includes, by way of example, work implement lever 18, 19 and travel lever 11, 12, locking lever 20, monitor apparatus 21, a first hydraulic pump 31A, a second hydraulic pump 31B, a swash plate drive apparatus 32, a pump controller 33, a control valve 34, a hydraulic actuator 35, an engine 36, a governor motor 37, an engine controller 38, a fuel dial 39, a rotation sensor 40, a work implement lever apparatus 41, a pressure switch 42, a valve 43, a potentiometer 45, a starter switch 46, a pressure sensor 47, and a main controller 50.

In addition, the control system of work vehicle 101 further includes a radiator 60, a cooling pump 61, an exhaust purification unit 62, a relay connection pipe (mixing piping) 64, a selective catalytic reduction apparatus 65, a flue 66, cooling piping 67, a temperature sensor 70, and a reducing agent injector 84.

Reducing agent injector 84 has a reducing agent tank 69, a reducing agent supply pump 82, and a reducing agent injection valve 68.

Exhaust purification unit 62 includes a diesel oxidation catalyst apparatus 62A and a diesel particulate filter apparatus 62B.

First hydraulic pump 31A discharges hydraulic oil used for driving work implement 4 or the like.

Second hydraulic pump 31B discharges oil made use of for generating a hydraulic pressure (a pilot pressure) in accordance with an operation of work implement lever 18, 19 and travel lever 11, 12. Swash plate drive apparatus 32 is connected to first hydraulic pump 31A.

Swash plate drive apparatus 32 drives based on an instruction from pump controller 33 and changes an angle of inclination of a swash plate of first hydraulic pump 31A. Hydraulic actuator 35 is connected to first hydraulic pump 31A with control valve 34 being interposed. Hydraulic actuator 35 is a cylinder for boom, a cylinder for arm, a cylinder for bucket, a hydraulic motor for revolution, a hydraulic motor for travel, and the like.

Control valve 34 is connected to work implement lever apparatus 41. Work implement lever apparatus 41 outputs to control valve 34, a pilot pressure in accordance with a direction of operation and/or an amount of operation of work implement lever 18, 19 and travel lever 11, 12. Control valve 34 controls hydraulic actuator 35 in accordance with the pilot pressure.

Work implement lever 18, 19 and travel lever 11, 12 as well as locking lever 20 are connected to second hydraulic pump 31B.

Pressure sensor 47 is connected to work implement lever apparatus 41. Pressure sensor 47 outputs to main controller 50, a lever operation signal in accordance with a state of operation of work implement lever 18, 19 and travel lever 11, 12.

In response to an instruction from main controller 50, pump controller 33 carries out such control that first hydraulic pump 31A absorbs best matching torque at each output point of engine 36, in accordance with pump absorption torque set in accordance with an amount of working, the number of rotations of the engine set with fuel dial 39 or the like, the actual number of rotations of the engine, and the like.

Engine 36 has a drive shaft connected to first hydraulic pump 31A, second hydraulic pump 31B, and cooling pump 61. Governor motor 37 adjusts an amount of fuel injection by a fuel injector within engine 36.

Engine controller 38 controls an operation of engine 36. Engine 36 is a diesel engine by way of example. The number of engine rotations of engine 36 is set with fuel dial 39 or the like and the actual number of engine rotations is detected by rotation sensor 40. Rotation sensor 40 is connected to main controller 50.

Fuel dial 39 is provided with potentiometer 45, which detects an amount of operation of fuel dial 39 and outputs a value indicated by a dial (also referred to as a dial indication value) regarding the number of rotations of engine 36 to engine controller 38. A target number of rotations of engine 36 is adjusted in accordance with the dial indication value of fuel dial 39.

In response to an instruction from main controller 50, engine controller 38 gives an instruction to governor motor 37 based on a dial indication value, controls an amount of fuel injected by the fuel injector or the like, and adjusts the number of rotations of engine 36.

Starter switch 46 is connected to engine controller 38. As the operator operates starter switch 46 (sets the starter switch to start), a start signal is output to engine controller 38 so that engine 36 starts.

Main controller 50 is a controller controlling overall work vehicle 101, and it is configured with a CPU (Central Processing Unit), a non-volatile memory, a timer, and the like. Main controller 50 controls pump controller 33, engine controller 38, monitor apparatus 21, cooling pump 61, and the like.

A dial indication value from fuel dial 39 and a start signal from starter switch 46 are input also to main controller 50 through engine controller 38. In the present example, for example, though a case where a dial indication value regarding the number of rotations of engine 36 is input to main controller 50 through engine controller 38 is described, limitation to such a scheme is not particularly intended, and for example, a configuration can also be such that a dial indication value from fuel dial 39 is directly input to main controller 50.

Pressure switch 42 is connected to locking lever 20. Pressure switch 42 senses an operation of locking lever 20 when it is operated toward a locking side, and sends a signal to valve (solenoid valve) 43. Since valve 43 cuts off supply of oil, such functions as operation of work implement 4, revolution of upper revolving unit 3, and travel of lower carrier 1 can be stopped. In addition, pressure switch 42 sends a similar signal also to main controller 50. Main controller 50 senses a signal from pressure switch 42 and starts control for an idle reduction operation which will be described later. Main controller 50 senses an operation of locking lever 20 toward the locking side and starts control for an idle reduction operation.

Cooling pump 61 supplies a coolant to a circulation path as engine 36 drives. In the present example, cooling pump 61 operates based on motive power from engine 36, so as to cool radiator 60 provided in engine 36 and cooling piping 67 provided in reducing agent injector 84.

Diesel oxidation catalyst apparatus 62A has a function to decrease nitric oxide (NO) of nitrogen oxides (NOx) in the exhaust gas from engine 36 and increase nitrogen dioxide ($NO_2$).

Diesel particulate filter apparatus 62B is an apparatus treating an exhaust from engine 36. Diesel particulate filter apparatus 62B is constructed to collect particulate matters included in the exhaust from engine 36 with a filter and burn the collected particulate matters. The filter is composed, for example, of ceramics.

Selective catalytic reduction apparatus 65 serves, for example, to hydrolyze an urea solution as a reducing agent to thereby reduce a nitrogen oxide NOx. Selective catalytic reduction apparatus 65 applies, in principle, chemical reaction of a nitrogen oxide (NOx) with ammonia ($NH_3$), which results in reduction to nitrogen ($N_2$) and water ($H_2O$). For example, reducing agent tank 69 containing an urea solution is mounted on work vehicle 101. It is noted that the reducing agent is not limited to an urea solution and a reducing agent should only be able to reduce a nitrogen oxide NOx.

Relay connection pipe (mixing piping) 64 connects between diesel particulate filter apparatus 62B and selective catalytic reduction apparatus 65. Mixing piping 64 connects diesel particulate filter apparatus 62B and selective catalytic reduction apparatus 65. In this mixing piping 64, a reducing agent is injected to an exhaust gas from the diesel particulate filter apparatus to selective catalytic reduction apparatus 65 and mixed.

Reducing agent injector 84 injects a reducing agent (an urea solution) pumped up from reducing agent tank 69 by reducing agent supply pump 82 to the exhaust gas through reducing agent injection valve 68.

In the vicinity of reducing agent injection valve 68 of reducing agent injector 84, cooling piping 67 which is a part of a circulation path of the coolant for suppressing reducing agent injector 84 being maintained in the high-temperature state by the exhaust gas is provided. Cooling pump 61 supplies the coolant to this cooling piping 67 to thereby cool cooling piping 67. Reducing agent injector 84 including reducing agent injection valve 68 is cooled by cooling piping 67 through which the coolant is supplied.

Temperature sensor 70 detects a temperature of the exhaust gas which passes through relay connection pipe (mixing piping) 64 and outputs the temperature to main controller 50.

Flue 66 is connected to selective catalytic reduction apparatus 65 and it serves to exhaust an exhaust which has passed through selective catalytic reduction apparatus 65 into the atmosphere.

It is noted that engine 36, reducing agent injector 84, and diesel particulate filter apparatus 62B represent examples of the "engine", the "injector", and the "collection apparatus" of the present invention, respectively. It is noted that cooling pump 61 and cooling piping 67 represent one example of the "cooling apparatus" of the present invention.

<Monitor Apparatus>

A configuration of monitor apparatus 21 will now be described.

Figure 4:
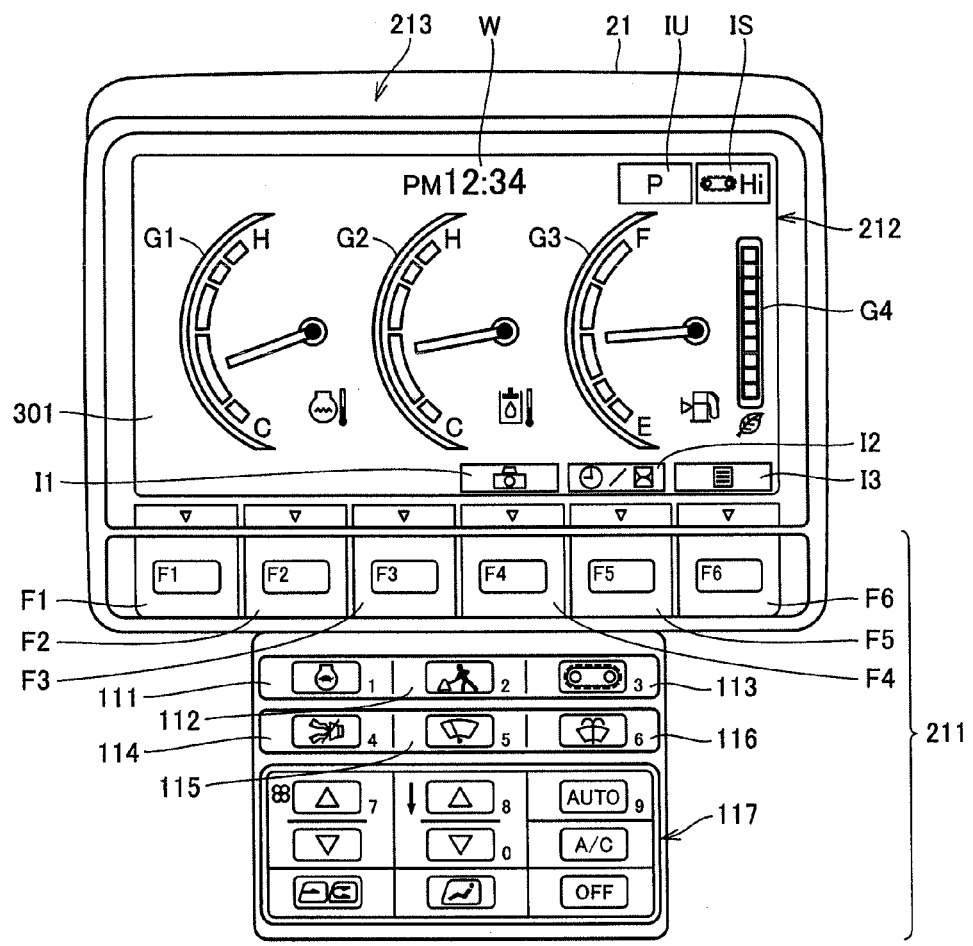
FIG. 4 is a diagram illustrating a configuration of a monitor apparatus 21 based on the first embodiment.

FIG. 4 is a diagram illustrating a configuration of monitor apparatus 21 based on the first embodiment.

As shown in FIG. 4, monitor apparatus 21 includes an input portion 211, a display portion 212, and a display control unit 213.

Input portion 211 accepts input of various types of information. Monitor apparatus 21 is connected to main controller 50, and input accepted at input portion 211 is output to main controller 50.

Display portion 212 is implemented by a liquid crystal screen or the like.

Display control unit 213 controls display contents on display portion 212. Specifically, display control unit 213 provides display of information on an operation of work vehicle 101 in response to an instruction from main controller 50. The information includes information on an engine state or guidance information, warning information, and the like.

Input portion 211 will specifically be described. Input portion 211 is constituted of a plurality of switches. Input portion 211 has function switches F1 to F6.

Function switches F1 to F6 are located in a lower portion of display portion 212 and displayed as "F1" to "F6", respectively. They are switches each for inputting a signal corresponding to an icon displayed on display portion 212 above each switch (by way of example, guidance icons I1 to I3).

In addition, input portion 211 has a deceleration switch 111, an operation mode selection switch 112, a travel speed gear selection switch 113, a buzzer cancellation switch 114, a wiper switch 115, a washer switch 116, and an air-conditioner switch 117, provided under function switches F1 to F6.

Deceleration switch 111 is a switch for carrying out deceleration control for lowering the number of engine rotations of engine 36 to a prescribed number of rotations a prescribed time period after work implement lever 18, 19 returned to a neutral position. The "neutral position" refers to a state that work implement lever 18, 19 is not operated (a non-working state).

Operation mode selection switch 112 is a switch for selecting an operation mode of work vehicle 101 from among a plurality of operation modes. Travel speed gear selection switch 113 is a switch for selecting a travel speed gear of work vehicle 101 from among a plurality of travel speed gears. Buzzer cancellation switch 114 is a switch for cancelling buzzer sound generated at the time when work vehicle 101 is in a prescribed warning condition. Wiper switch 115 is a switch for operating a wiper (not shown) provided in a windshield of operator's cab 8 (see FIG. 2) of work vehicle 101. Washer switch 116 is a switch for actuating a washer (not shown) for injecting cleaning water toward the windshield. Air-conditioner switch 117 is a switch for operating various functions of an air-conditioner within operator's cab 8.

It is noted that a touch panel of a resistive film type or the like is also applicable as input portion 211. In the present example, a case where work vehicle 101 displays a standard picture 301 displayed during a normal operation as a picture displayed on display portion 212 is shown.

Standard picture 301 is generated by display control unit 213 based on data for displaying a picture, which is stored in advance in a not-shown memory. This is also the case with other pictures.

In standard picture 301, an engine water temperature gauge G1, a hydraulic oil temperature gauge G2, and a fuel level gauge G3 are displayed as aligned, and a pointer of a gauge changes based on a sensor signal from each corresponding sensor. In addition, a fuel consumption gauge G4 is displayed on the right of fuel level gauge G3.

A clock W is displayed in an upper central portion of display portion 212. On the right of clock W, an operation mode icon IU indicating a set operation mode and a travel speed gear icon IS indicating a set travel speed gear are displayed.

In standard picture 301, a character "P" is displayed as operation mode icon IU. This is an indication of a case where an operation mode is set to a power mode made use of in normal excavation working or the like.

In contrast, in a case where work vehicle 101 is set to an economy mode, it is assumed that a character "E" is displayed as operation mode icon IU.

In addition, in standard picture 301, an icon including such a character string as "Hi" is displayed as travel speed gear icon IS.

This icon is an indication of a case where a travel speed gear is set to high. A travel speed gear selected and input through travel speed gear selection switch 113 includes three types of low, intermediate, and high.

Among these, when a low speed is selected, an icon including a character string "Lo" is displayed as travel speed gear icon IS. Alternatively, when an intermediate speed is selected, an icon including a character string "Mi" is displayed as travel speed gear icon IS.

At a position in a lower portion of standard picture 301 and above function switches F4 to F6, guidance icons I1 to I3 corresponding to function switches F4 to F6, respectively, are displayed.

Guidance icon I1 is an icon meaning switching of a picture displayed on display portion 212 to a camera screen. The camera screen is a screen output by means of an image signal obtained by a CCD camera or the like (not shown) installed on the exterior of work vehicle 101 and shooting an outside world of work vehicle 101. Guidance icon I2 is an icon meaning switching of display of clock W to display of a service meter. Guidance icon I3 is an icon meaning switching of a picture displayed on display portion 212 to a user mode picture. Therefore, for example, when function switch F4 corresponding to guidance icon I1 is pressed, a picture displayed on display portion 212 is switched to a camera screen.

Figure 5:
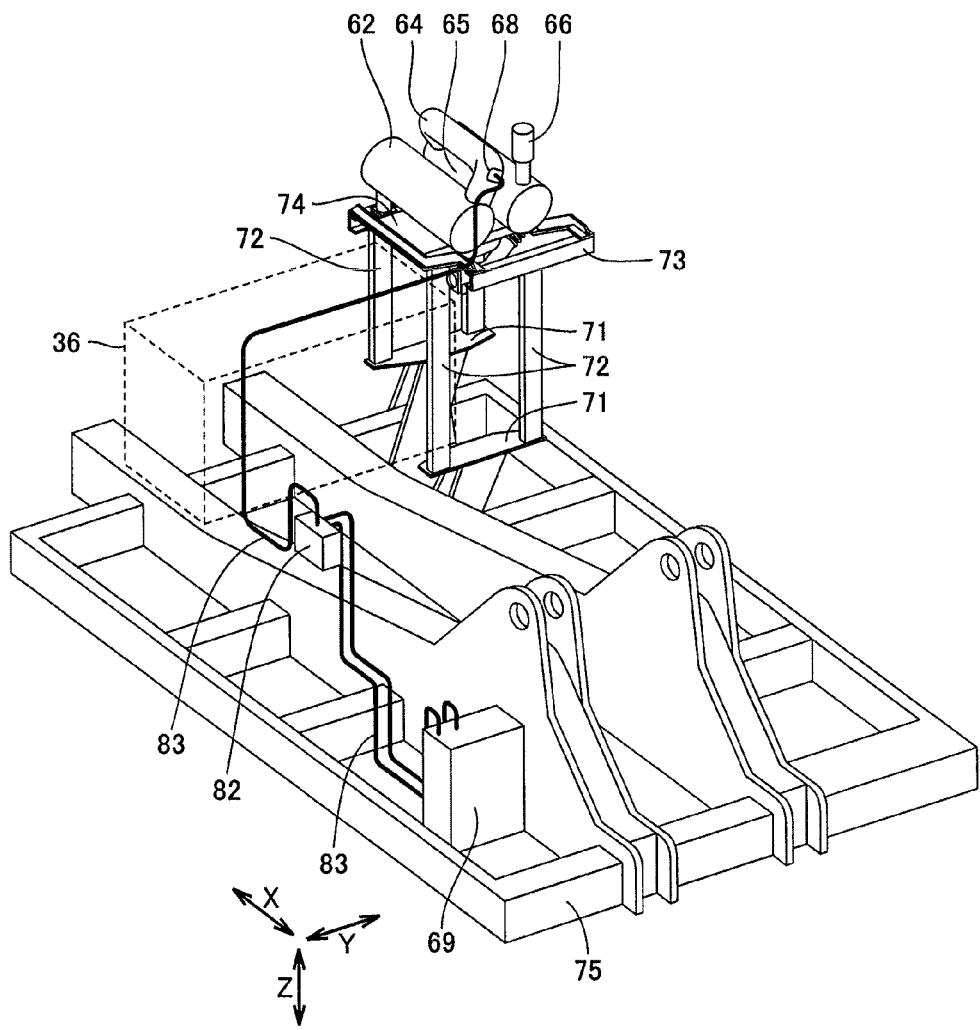
FIG. 5 is a diagram illustrating a construction supplying urea to a selective catalytic reduction apparatus of an exhaust treatment unit based on the first embodiment.

FIG. 5 is a diagram illustrating a construction supplying urea to the selective catalytic reduction apparatus of the exhaust treatment unit based on the first embodiment.

Referring to FIG. 5, in the present embodiment, engine 36 and the exhaust treatment unit are supported by a body frame 75 independently of each other.

Specifically, as features of a support for supporting the exhaust treatment unit on the frame, two plates 71, four vertical frames (pillar members) 72, a horizontal frame 73, and a bracket 74 are provided.

Each of two plates 71 has a flat plate shape and is attached to body frame 75. Each of four vertical frames 72 has a shape like a pillar and is attached to plate 71. Each of four vertical frames 72 extends upward from a position of attachment to plate 71.

Horizontal frame 73 is attached to vertical frame 72. Horizontal frame 73 is a portion for supporting exhaust purification unit 62 and selective catalytic reduction apparatus 65.

Bracket 74 has a flat plate shape. It is attached to horizontal frame 73.

A construction in which urea solution piping (reducing agent piping) connects relay connection pipe (mixing piping) 64 of the exhaust treatment unit and reducing agent tank 69 to each other is shown.

Selective catalytic reduction apparatus 65 serves to selectively reduce a nitrogen oxide NOx, for example, by making use of ammonia obtained by hydrolysis of an urea solution. Therefore, an apparatus supplying an urea solution to selective catalytic reduction apparatus 65 is required.

This reducing agent injector 84 mainly has reducing agent injection valve 68, reducing agent tank 69, reducing agent supply pump 82, and reducing agent piping 83. Reducing agent tank 69 is constructed to be able to store the urea solution.

This reducing agent tank 69 is arranged, for example, outside an engine room, and supported by body frame 75.

Reducing agent piping 83 connects this reducing agent tank 69 and mixing piping 64 to each other. This reducing agent piping 83 can guide the urea solution stored in reducing agent tank 69 to mixing piping 64.

Reducing agent supply pump 82 is arranged at an intermediate point of a path of reducing agent piping 83. This reducing agent supply pump 82 is responsible for delivering the urea solution from reducing agent tank 69 through reducing agent piping 83 to mixing piping 64.

By driving reducing agent supply pump 82 of reducing agent injector 84 above, the urea solution stored in reducing agent tank 69 is injected and supplied into mixing piping 64 from reducing agent injection valve 68 through reducing agent piping 83.

In reducing agent injector 84 above, reducing agent piping 83 is connected from the same side (a front side in the drawing) in a longitudinal direction (an X direction) to mixing piping 64. A connection portion of reducing agent piping 83 to mixing piping 64 is on the upstream side of an exhaust path in mixing piping 64. Thus, the urea solution injected and supplied to mixing piping 64 is evenly mixed with the exhaust while it runs from upstream to downstream in mixing piping 64.

Figure 6:
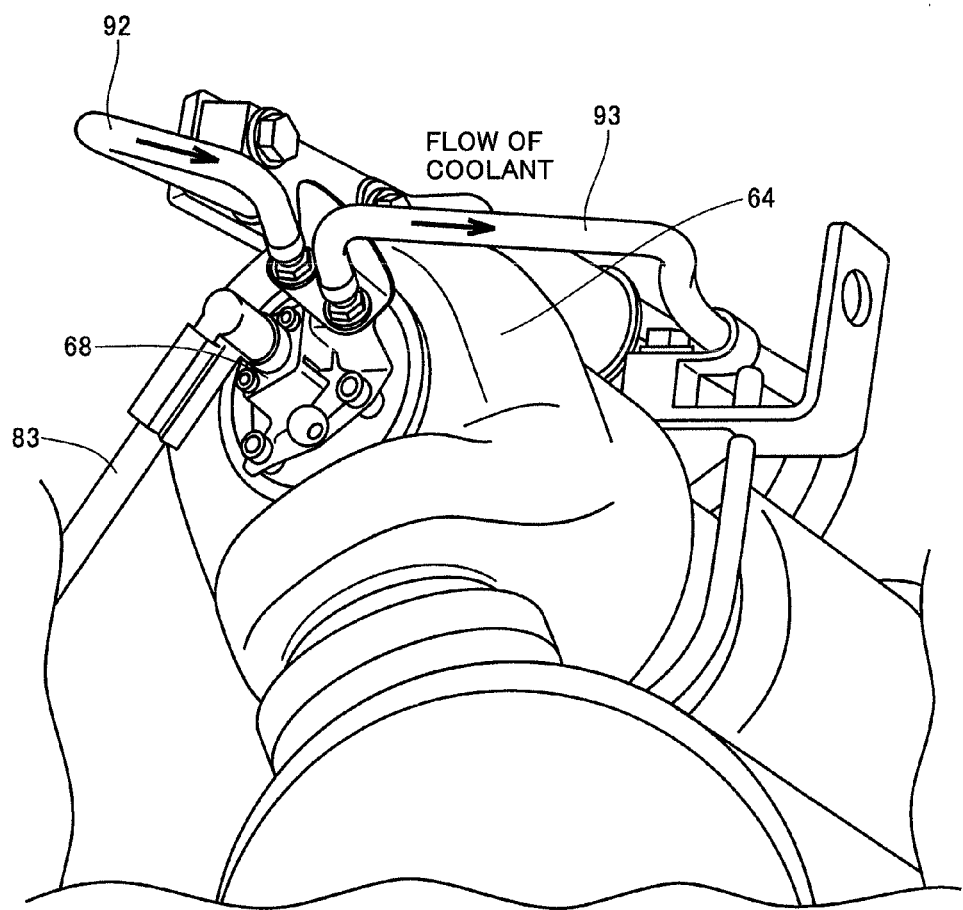
FIG. 6 is a diagram illustrating a state around a reducing agent injection valve 68 based on the first embodiment.

FIG. 6 is a diagram illustrating a state around reducing agent injection valve 68 based on the first embodiment.

As shown in FIG. 6, reducing agent injection valve 68 connected to reducing agent piping 83 is attached on the upstream side of the exhaust path in mixing piping 64.

In addition, a state that coolant piping 92, 93 is connected in the vicinity of reducing agent injection valve 68 is shown.

Figure 7:
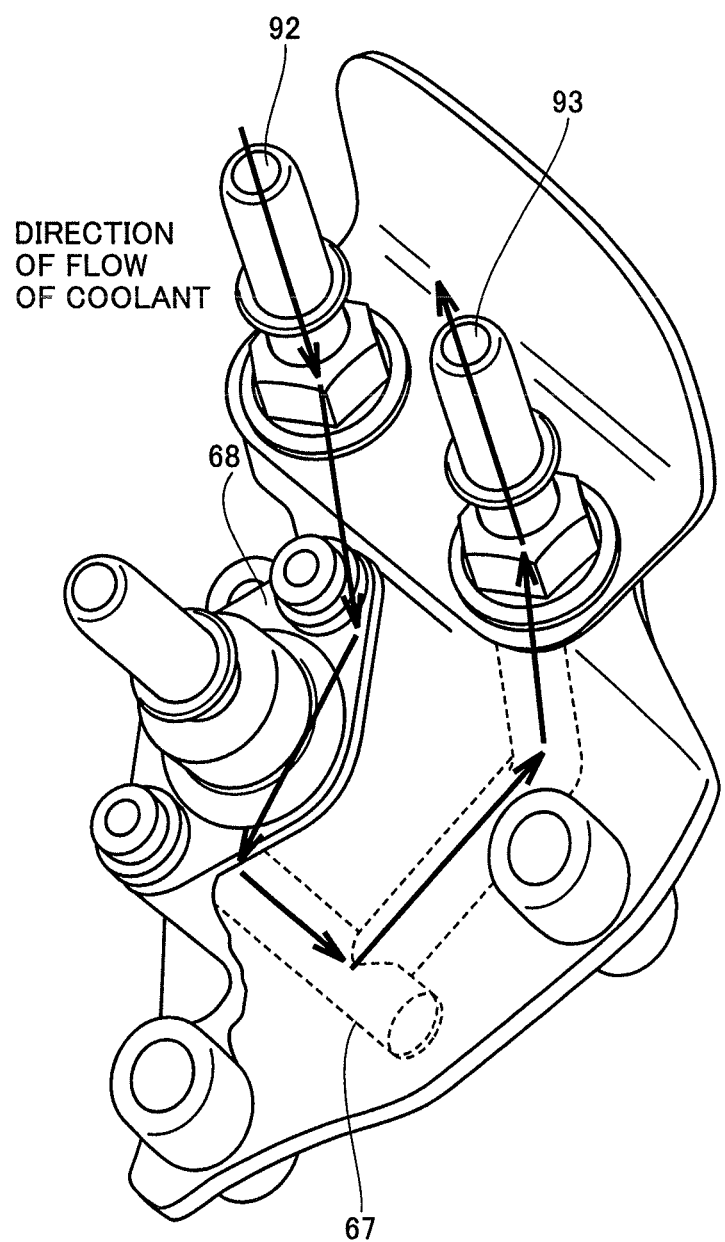
FIG. 7 is a diagram illustrating an internal state of reducing agent injection valve 68 based on the first embodiment.

FIG. 7 is a diagram illustrating an internal state of reducing agent injection valve 68 based on the first embodiment.

As shown in FIG. 7, cooling piping 67 through which the coolant flows is provided within reducing agent injection valve 68. As the coolant is supplied through a path of cooling piping 92, cooling piping 67, and cooling piping 93, reducing agent injection valve 68 is cooled.

<Functional Block Diagram>

Figure 8:
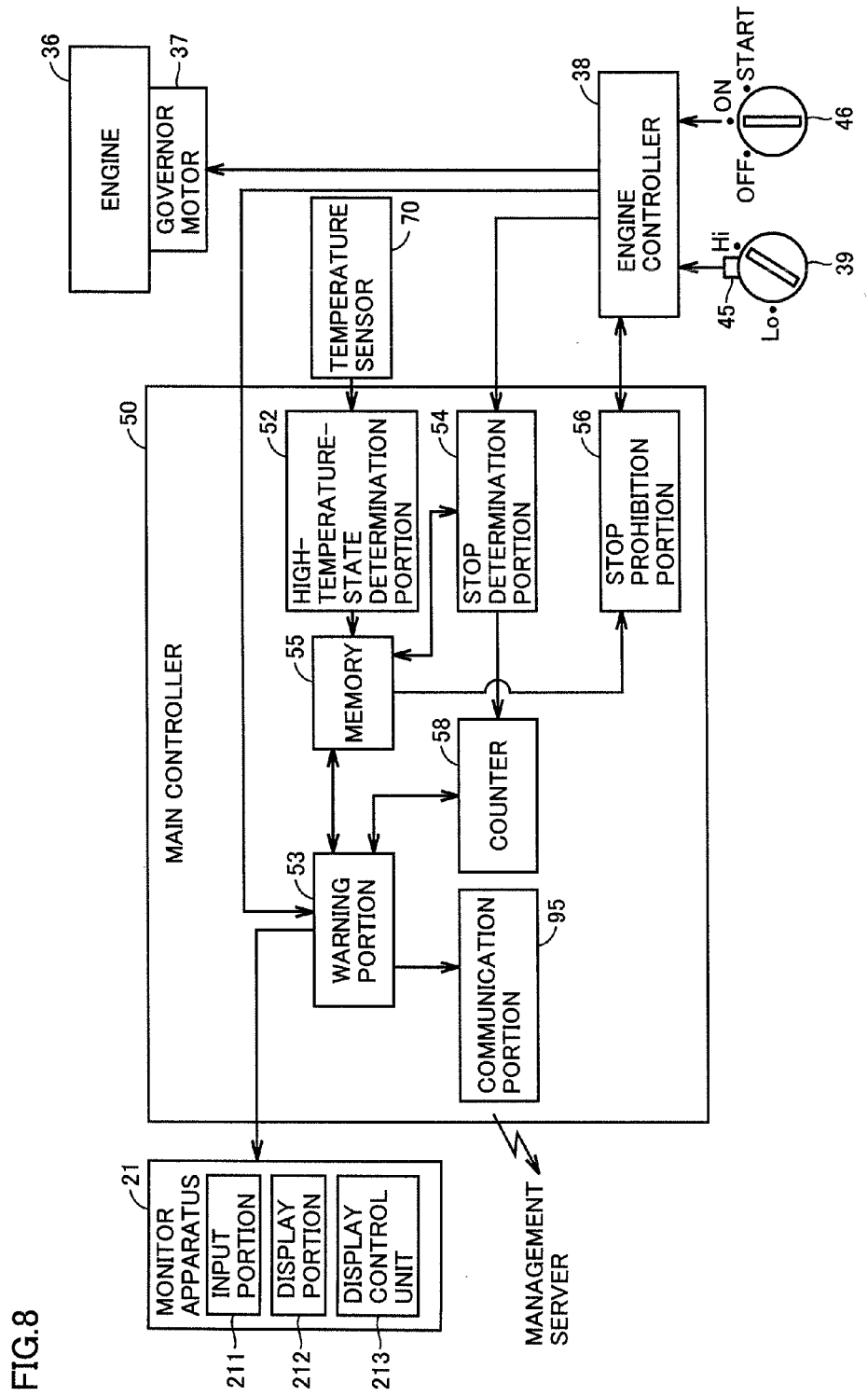
FIG. 8 is a functional block diagram illustrating a main controller 50 in the control system of work vehicle 101 based on the first embodiment.

FIG. 8 is a functional block diagram illustrating main controller 50 in the control system of work vehicle 101 based on the first embodiment.

As shown in FIG. 8, relation between main controller 50 and other peripheral devices is shown. Here, monitor apparatus 21, engine 36, governor motor 37, engine controller 38, fuel dial 39, potentiometer 45, starter switch 46, and temperature sensor 70 are shown as the peripheral devices.

Main controller 50 includes a high-temperature-state determination portion 52, a stop determination portion 54, a memory 55, a stop prohibition portion 56, a counter 58, a warning portion 53, and a communication portion 95.

High-temperature-state determination portion 52 determines whether or not reducing agent injector 84 is in the high-temperature state based on a temperature detected by temperature sensor 70. When high-temperature-state determination portion 52 determines that reducing agent injector 84 is in the high-temperature state, it sets a high-temperature flag stored in a prescribed area of memory 55 to "on". On the other hand, when high-temperature-state determination portion 52 determines that reducing agent injector 84 is not in the high-temperature state based on a temperature detected by temperature sensor 70, it sets the high-temperature flag stored in the prescribed area of memory 55 to "off". In the present example, by way of example, a case that "on" of the high-temperature flag is defined as "1" and "off" of the high-temperature flag is defined as "0" is described. It is noted that "on" of the high-temperature flag may be defined as "0" and "off" of the high-temperature flag may be defined as "1".

Stop determination portion 54 determines whether or not engine 36 has stopped while reducing agent injector 84 is in the high-temperature state. Stop determination portion 54 determines whether or not engine 36 has stopped while the high-temperature flag stored in the prescribed area of memory 55 is in an "on" state. When stop determination portion 54 determines that engine 36 has stopped while reducing agent injector 84 is in the high-temperature state, it gives an instruction to counter 58. Stop determination portion 54 resets the high-temperature flag stored in the prescribed area of memory 55. Specifically, stop determination portion 54 sets the high-temperature flag to "off".

Counter 58 increments a count value in accordance with an instruction from stop determination portion 54.

When a prescribed value (a first prescribed value) is exceeded based on the count value of counter 58, warning portion 53 instructs monitor apparatus 21 to give a warning. When a prescribed value (a second prescribed value) is exceeded based on the count value of counter 58, warning portion 53 gives a notification to that effect to stop prohibition portion 56.

Display control unit 213 of monitor apparatus 21 causes display portion 212 to display prescribed warning information in accordance with an instruction from warning portion 53.

Communication portion 95 transmits the count value of counter 58 to a management server in accordance with the instruction from warning portion 53.

Stop prohibition portion 56 instructs engine controller 38 not to stop engine 36 based on the instruction from warning portion 53 and a status of the high-temperature flag set in the prescribed area of memory 55. Engine controller 38 prohibits output of an engine stop signal to governor motor 37 in accordance with an instruction from stop prohibition portion 56. Thus, stop of engine 36 can be prohibited in accordance with the instruction from stop prohibition portion 56. For example, even when an operator operates starter switch 46 to "off", in a case that an instruction from stop prohibition portion 56 is given, engine controller 38 does not stop engine 36.

When the high-temperature flag is "on", stop prohibition portion 56 continually outputs an instruction to prohibit stop. When the high-temperature flag is set to "off", an instruction to prohibit stop ends. After engine controller 38 has received an instruction to prohibit stop of engine 36 from stop prohibition portion 56, it prohibits stop of engine 36 and stops engine 36 after the end of the instruction to prohibit stop of engine 36 from stop prohibition portion 56.

It is noted that high-temperature-state determination portion 52, stop determination portion 54, counter 58, warning portion 53, and communication portion 95 represent examples of the "determination portion", the "stop determination portion," the "counter", the "warning portion", and the "communication portion" in the present invention, respectively.

<Flow Processing>

Figure 9:
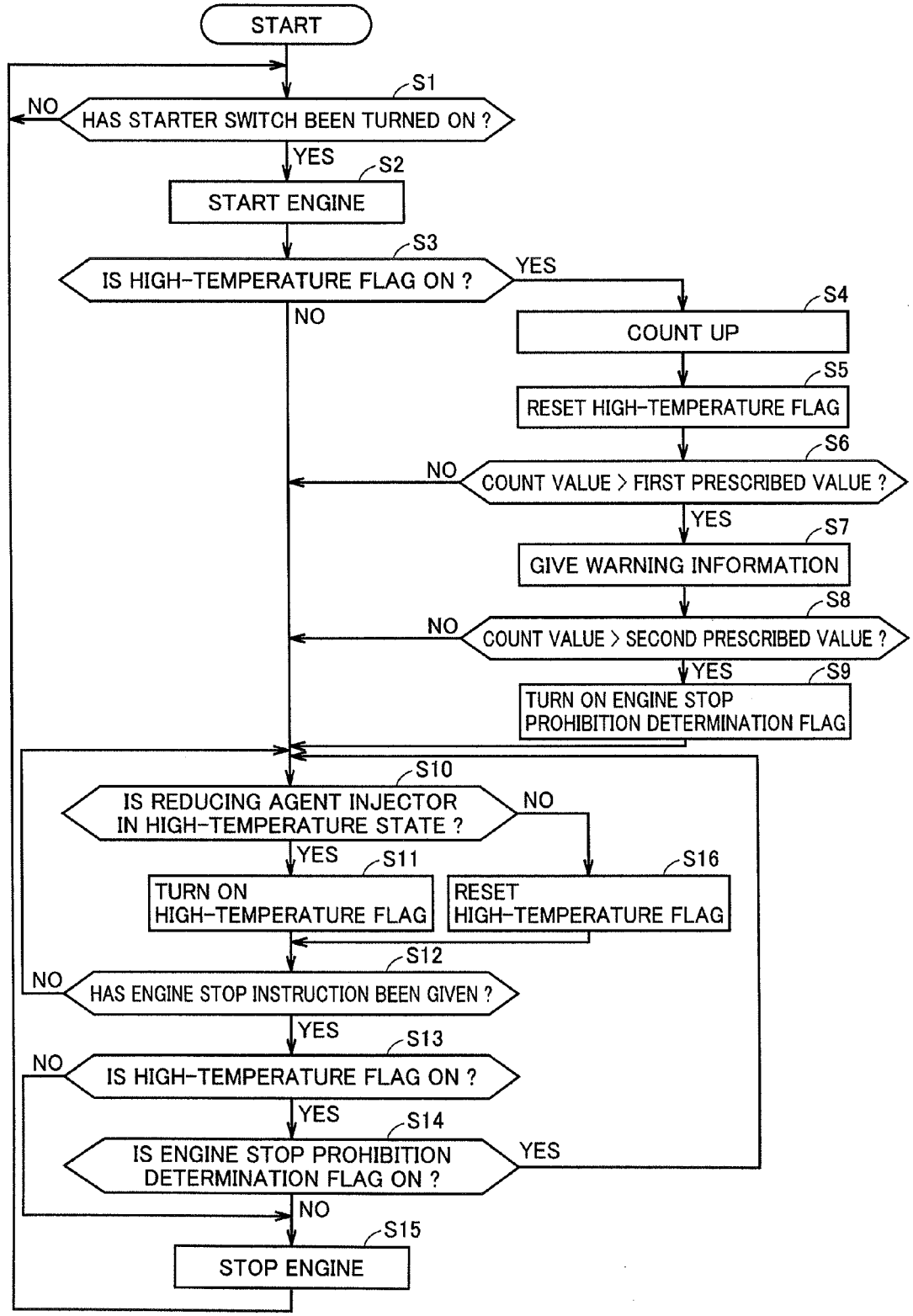
FIG. 9 is a flowchart illustrating a warning function of the control system of work vehicle 101 based on the first embodiment.

FIG. 9 is a flowchart illustrating a warning function of the control system of work vehicle 101 based on the first embodiment.

As shown in FIG. 9, whether or not starter switch 46 has been turned "on" is determined (step S1). Specifically, engine controller 38 determines whether or not starter switch 46 has been turned on as it accepts an operation instruction from starter switch 46.

When it is determined that starter switch 46 has been turned "on", engine 36 is started (step S2). Specifically, engine controller 38 instructs governor motor 37 to start engine 36. In addition, engine controller 38 outputs an indication that engine 36 has been started to stop determination portion 54 of main controller 50.

Then, whether or not the high-temperature flag is "on" is determined (step S3). Specifically, stop determination portion 54 determines whether or not the high-temperature flag has been set to "on" with reference to memory 55.

When it is determined in step S3 that the high-temperature flag has been set to "on" (YES in step S3), the counter is counted up (step S4). Specifically, when stop determination portion 54 determines that the high-temperature flag has been set to "on" with reference to memory 55, stop determination portion 54 gives an instruction to counter 58. Counter 58 thus increments a count value.

Then, the high-temperature flag is reset (step S5). Specifically, stop determination portion 54 resets the status of the high-temperature flag "on" and sets the high-temperature flag to "off" with reference to memory 55.

Then, whether or not the count by the counter has exceeded the first prescribed value is determined (step S6). Specifically, warning portion 53 determines whether or not the count value of counter 58 has exceeded the prescribed value (the first prescribed value). For example, "150" can be set as the prescribed value (the first prescribed value).

When it is determined in step S6 that the count value has not exceeded the first prescribed value (NO in step S6), the process proceeds to step S10.

On the other hand, when it is determined in step S6 that the count value has exceeded the first prescribed value (YES in step S6), warning information is given (step S7). Specifically, warning portion 53 instructs monitor apparatus 21 to give a warning and display control unit 213 of monitor apparatus 21 causes display portion 212 to display prescribed warning information.

Then, whether or not the count value has exceeded the second prescribed value is determined (step S8). Specifically, warning portion 53 determines whether or not the count value of counter 58 has exceeded the prescribed value (the second prescribed value). For example, "200" can be set as the prescribed value (the second prescribed value).

When it is determined in step S8 that the count value has not exceeded the second prescribed value (NO in step S8), the process proceeds to step S10.

On the other hand, when it is determined in step S8 that the count value has exceeded the second prescribed value (YES in step S8), an engine stop prohibition determination flag is set to "on" (step S9). Specifically, when warning portion 53 determines that the count value has exceeded the second prescribed value, it sets the engine stop prohibition determination flag stored in the prescribed area of memory 55 to "on". The engine stop prohibition determination flag is used in processing for prohibiting stop of engine 36 in giving an instruction to stop engine 36, which will be described later. Then, the process proceeds to next step S10.

When it is determined in step S3 that the high-temperature flag has not been set to "on" (NO in step S3), the processing in steps S4 to S9 is skipped and the process proceeds to step S10.

Then, whether or not the reducing agent injector is in the high-temperature state is determined in step S10. Specifically, high-temperature-state determination portion 52 determines whether or not reducing agent injector 84 is in the high-temperature state based on a temperature detected by temperature sensor 70.

When it is determined in step S10 that reducing agent injector 84 is in the high-temperature state (YES in step S10), the high-temperature flag is set to "on" (step S11). Specifically, when high-temperature-state determination portion 52 determines that reducing agent injector 84 is in the high-temperature state, it sets the high-temperature flag stored in the prescribed area of memory 55 to "on".

When it is determined in step S10 that reducing agent injector 84 is not in the high-temperature state (NO in step S10), the high-temperature flag is reset (step S16). Specifically, when high-temperature-state determination portion 52 determines that reducing agent injector 84 is not in the high-temperature state, it sets the high-temperature flag stored in the prescribed area of memory 55 to "off".

Then, whether or not an engine stop instruction has been given is determined (step S12). Specifically, engine controller 38 determines whether or not starter switch 46 has been turned "off" as it accepts an operation instruction from starter switch 46. When engine controller 38 determines that starter switch 46 has been turned "off" as it accepted an operation instruction from starter switch 46, it notifies stop prohibition portion 56 of the fact that an engine stop instruction has been given. Stop prohibition portion 56 determines whether or not it has received a notification that the engine stop instruction from engine controller 38 has been given.

When it is determined in step S12 that no engine stop instruction has been given, the process returns to step S10, and when it is determined that an engine stop instruction has been given (YES in step S12), whether or not the high-temperature flag is "on" is determined (step S13). Specifically, stop prohibition portion 56 determines whether or not stop of engine 36 has been prohibited in accordance with input of a notification that an engine stop instruction from engine controller 38 has been given. Stop prohibition portion 56 determines whether or not the high-temperature flag stored in the prescribed area of memory 55 has been set to "on".

When it is determined in step S13 that the high-temperature flag is "on" (YES in step S13), whether or not the engine stop prohibition determination flag is "on" is determined (step S14). Specifically, stop prohibition portion 56 determines whether or not the engine stop prohibition determination flag stored in the prescribed area of memory 55 is "on".

When it is determined in step S14 that the engine stop prohibition determination flag is "on" (YES in step S14), the process returns to step S10 and engine 36 is not stopped. Specifically, when stop prohibition portion 56 determines that the high-temperature flag stored in the prescribed area of memory 55 is "on" and the engine stop prohibition determination flag is "on", it instructs engine controller 38 not to stop engine 36. Thus, engine controller 38 processes the engine stop instruction as invalid.

When it is determined in step S13 that the high-temperature flag is not "on" (NO in step S13), the engine is stopped (step S15). Specifically, stop prohibition portion 56 notifies engine controller 38 of the fact that stop of engine 36 is not prohibited and engine controller 38 instructs governor motor 37 to stop engine 36. Engine 36 thus stops.

Then, the process returns to step S1 and returns to the initial state.

When it is determined in step S14 that the engine stop prohibition determination flag is not "on" (NO in step S14), the engine is stopped (step S15). Specifically, stop prohibition portion 56 notifies engine controller 38 of the fact that stop of engine 36 is not prohibited and engine controller 38 instructs governor motor 37 to stop engine 36. Engine 36 thus stops.

Then, the process returns to step S1 and returns to the initial state.

Therefore, when it is determined that the high-temperature flag indicating a temperature state of reducing agent injector 84 is "on" and the engine stop prohibition determination flag is "on", stop prohibition portion 56 can prevent engine 36 from stopping. Then, when the high-temperature flag indicating a temperature state of reducing agent injector 84 is set to "off" (a temperature of reducing agent injector 84 decreases and the state is no longer the high-temperature state), stop prohibition portion 56 ends an instruction for prohibiting stop of engine 36. Engine 36 can thus be stopped. Therefore, by preventing engine 36 from stopping while reducing agent injector 84 is in the high-temperature state, load imposed on reducing agent injector 84 can be suppressed.

Figure 10:
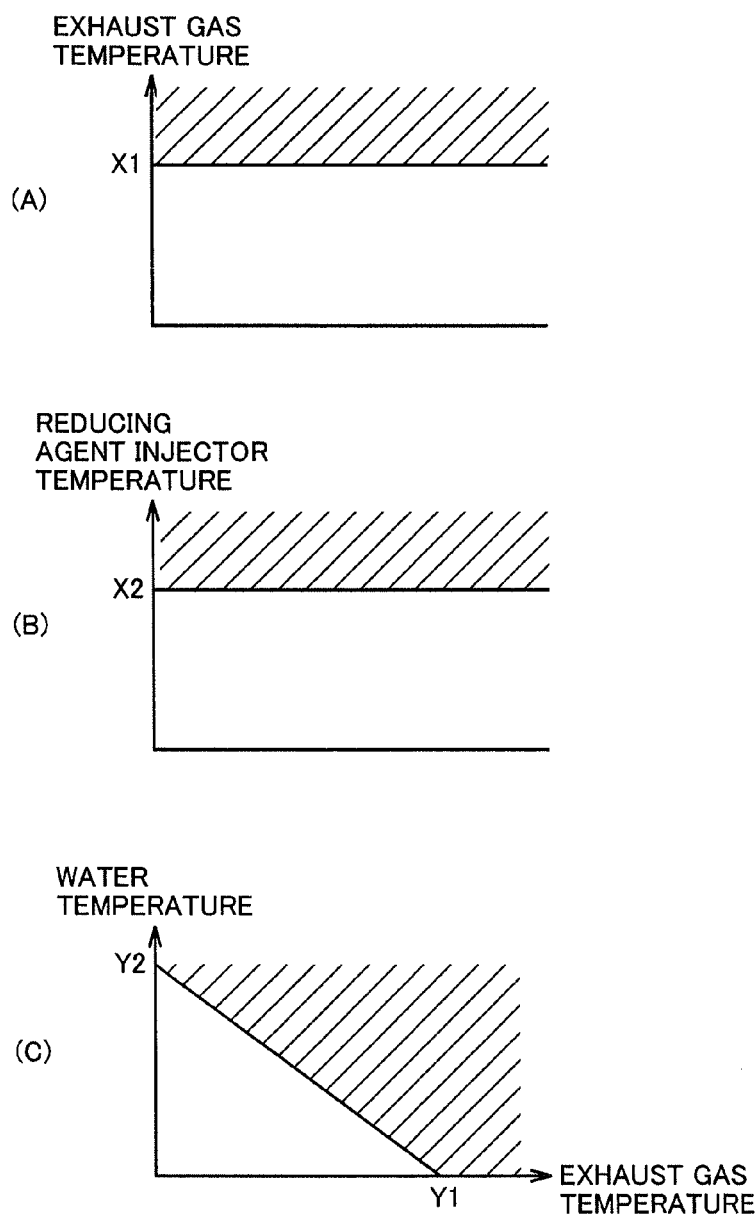
FIG. 10 is a diagram illustrating determination of a high-temperature state in a high-temperature-state determination portion 52 based on the first embodiment.

FIG. 10 is a diagram illustrating determination of the high-temperature state in high-temperature-state determination portion 52 based on the first embodiment.

As shown in FIG. 10 (A), high-temperature-state determination portion 52 determines that reducing agent injector 84 is in the high-temperature state when an exhaust gas temperature detected by temperature sensor 70 is equal to or higher than a prescribed temperature X1. The high-temperature state can be defined in accordance with relation with a heat resistance temperature determined based on a material, characteristics, and the like of components of reducing agent injector 84. For example, by way of example, when a state around the heat resistance temperature is established, it can be defined as the high-temperature state.

Then, high-temperature-state determination portion 52 sets the high-temperature flag in memory 55 to "on".

Though a case that temperature sensor 70 detects a temperature of an exhaust gas around an exhaust port exhausted from diesel particulate filter apparatus 62B so as to indirectly measure a temperature of reducing agent injector 84 so that high-temperature-state determination portion 52 determines the high-temperature state of reducing agent injector 84 is described in the present example, limitation to that scheme is not intended, and a state of reducing agent injector 84 may be determined with another scheme.

As shown in FIG. 10 (B), determination as the high-temperature state is made when reducing agent injector 84 attains to a temperature X2 or higher. For example, temperature sensor 70 may be attached to reducing agent injection valve 68 so as to directly measure a temperature of reducing agent injector 84, so that whether or not reducing agent injector 84 is in the high-temperature state is determined.

As shown in FIG. 10 (C), a plurality of parameters may be used to determine whether or not reducing agent injector 84 is in the high-temperature state.

Specifically, whether or not reducing agent injector 84 is in the high-temperature state can also be determined based on relation between an exhaust gas temperature and a temperature of the coolant. In the present example, by way of example, a case that an exhaust gas temperature at which reducing agent injector 84 is determined to be in the high-temperature state increases as a temperature of the coolant is lower is shown.

Though an example in which an exhaust gas temperature and a temperature of the coolant are used has been described in the present example, whether or not reducing agent injector 84 is in the high-temperature state may be determined further in consideration of an outside air temperature.

Though a case that a temperature of an exhaust gas around the exhaust port exhausted from diesel particulate filter apparatus 62B is detected has been described in the present example, limitation thereto is not particularly intended, and a temperature of an exhaust gas around an inlet of selective catalytic reduction apparatus 65 may be detected for determining whether or not reducing agent injector 84 is in the high-temperature state.

Though a scheme for determining whether or not reducing agent injector 84 is in the high-temperature state based on a temperature detected by temperature sensor 70 has been described in the present example, whether or not reducing agent injector 84 is in the high-temperature state can also be determined without providing temperature sensor 70. For example, when what is called regeneration treatment for burning PM (Particulate Matter) collected by diesel particulate filter apparatus 62B is performed, the high-temperature state is established and the exhaust gas is also in the high-temperature state. Therefore, determination that reducing agent injector 84 is in the high-temperature state may be made when a regeneration command is issued and the regeneration treatment is performed. In addition, an exhaust gas temperature also relates to engine output. Specifically, if the engine is in high revolution, a temperature of an emitted exhaust gas is also high. Therefore, whether or not reducing agent injector 84 is in the high-temperature state may be determined by using rotation sensor 40 measuring the number of output rotations of the engine and based on a result of measurement by rotation sensor 40. Alternatively, the number of output rotations of the engine may be estimated based on an output command value (a rotation command) output from potentiometer 45 of fuel dial 39 instead of the number of output rotations of the engine measured by rotation sensor 40, and whether or not a temperature of reducing agent injector 84 in accordance with an exhaust gas temperature is high may be determined based on a result of estimation.

<Warning Display>

Figure 11:
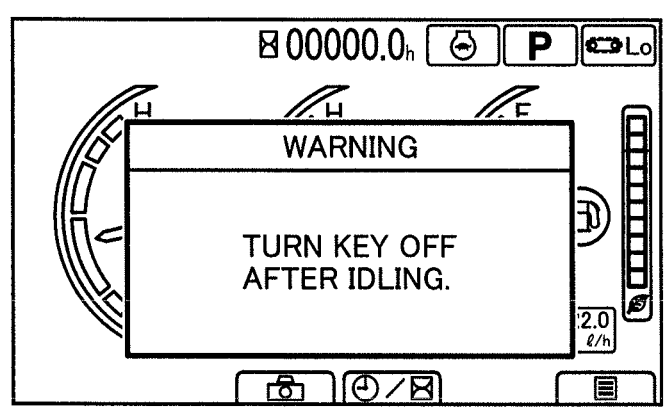
FIG. 11 is a diagram illustrating one example of warning information displayed on a monitor apparatus 21 based on the first embodiment.

FIG. 11 is a diagram illustrating one example of warning information displayed on monitor apparatus 21 based on the first embodiment.

As shown in FIG. 11, a case that warning information is given on display portion 212 of monitor apparatus 21 is shown. Specifically, a warning message that "turn key off after idling" is displayed. In the present example, when a count value of counter 58 exceeds a prescribed value (a first prescribed value), warning portion 53 gives warning information.

By giving an operator the warning information, in stopping engine 36, the operator can be urged to stop engine 36 while reducing agent injector 84 is not in the high-temperature state, instead of stopping engine 36 while reducing agent injector 84 is in the high-temperature state. Therefore, devices in reducing agent injector 84 can be protected. In particular in the present example, the number of times of stop of engine 36 while reducing agent injector 84 is in the high-temperature state is counted by counter 58 and the operator is given the warning information when the count value has exceeded the prescribed value (the first prescribed value). Therefore, by accurately grasping a degree of load imposed on reducing agent injector 84 and giving the operator warning information in accordance with the degree of load on reducing agent injector 84, devices in reducing agent injector 84 can be protected.

It is noted that the prescribed value (the first prescribed value) is a value set in consideration of a degree of load imposed on reducing agent injector 84 in a case that engine 36 is stopped while reducing agent injector 84 is in the high-temperature state, and a person skilled in the art could set a proper value as appropriate. It is noted that a proper value may be set by simulation. This is also the case with a prescribed value (a second prescribed value).

Though a case that a message is displayed on display portion 212 as warning information has been described in the present example, limitation thereto is not particularly intended and the message may be output through voice and sound. Alternatively, an icon associated with a message can be displayed for giving the operator warning information. Alternatively, as a notification scheme, processing for vibrating monitor apparatus 21 by making use of a vibration function or causing display on display portion 212 to blink by making use of a light emission function or the like can also be performed.

Contents of a message are not limited to the above, and any contents can be accepted so long as the contents urge stop of engine 36 while reducing agent injector 84 is not in the high-temperature state. Alternatively, information on maintenance, services, check, or the like can also be given.

In the present example, at the time of start of engine 36, when a count value has exceeded the prescribed value (the first prescribed value), the warning information is given on display portion 212. It is noted that the time of start of engine 36 means not only the timing of start of engine 36 but also a time period from start until lapse of a prescribed period. By giving the operator warning information at the time of start of engine 36, attention to warning information from an operator who starts work can effectively be called.

Though a scheme (S3 to S9) for performing processing for count-up of counter 58, notification of warning information, and the like at the time of start of engine 36 has been described in the present example, the processing for count-up of counter 58, notification of warning information, and the like may be performed after stop of engine 36 (after step S15).

(Variation of First Embodiment)

<Management Server>

Figure 12:
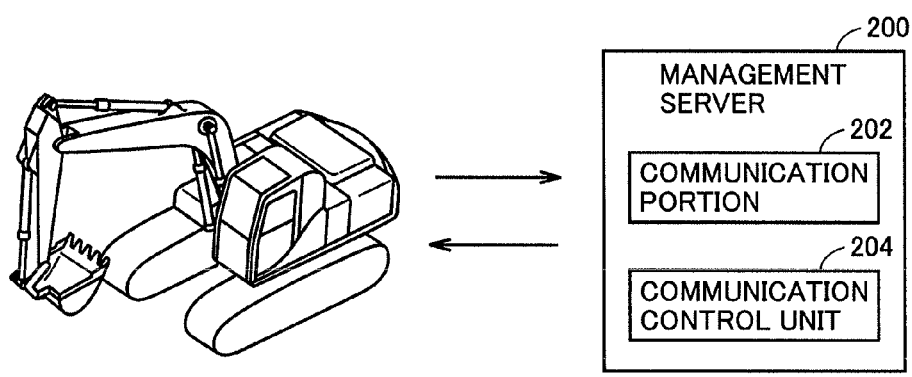
FIG. 12 is a diagram illustrating relation between work vehicle 101 and a management server 200 based on the first embodiment.

FIG. 12 is a diagram illustrating relation between work vehicle 101 and management server 200 based on the first embodiment.

As shown in FIG. 12, management server 200 is located at a place distant from work vehicle 101 and provided to be able to communicate with work vehicle 101.

In the present example, management server 200 includes a communication portion 202 and a communication control unit 204.

Communication portion 202 communicates with communication portion 95 of main controller 50 of work vehicle 101 through a network (not shown). In the present example, by way of example, communication portion 202 communicates with communication portion 95 and receives information on counter 58 of main controller 50.

Communication control unit 204 performs prescribed information processing through communication portion 202. As the prescribed information processing, analysis processing based on received information on counter 58 or the like is performed.

<Flow Processing>

Figure 13:
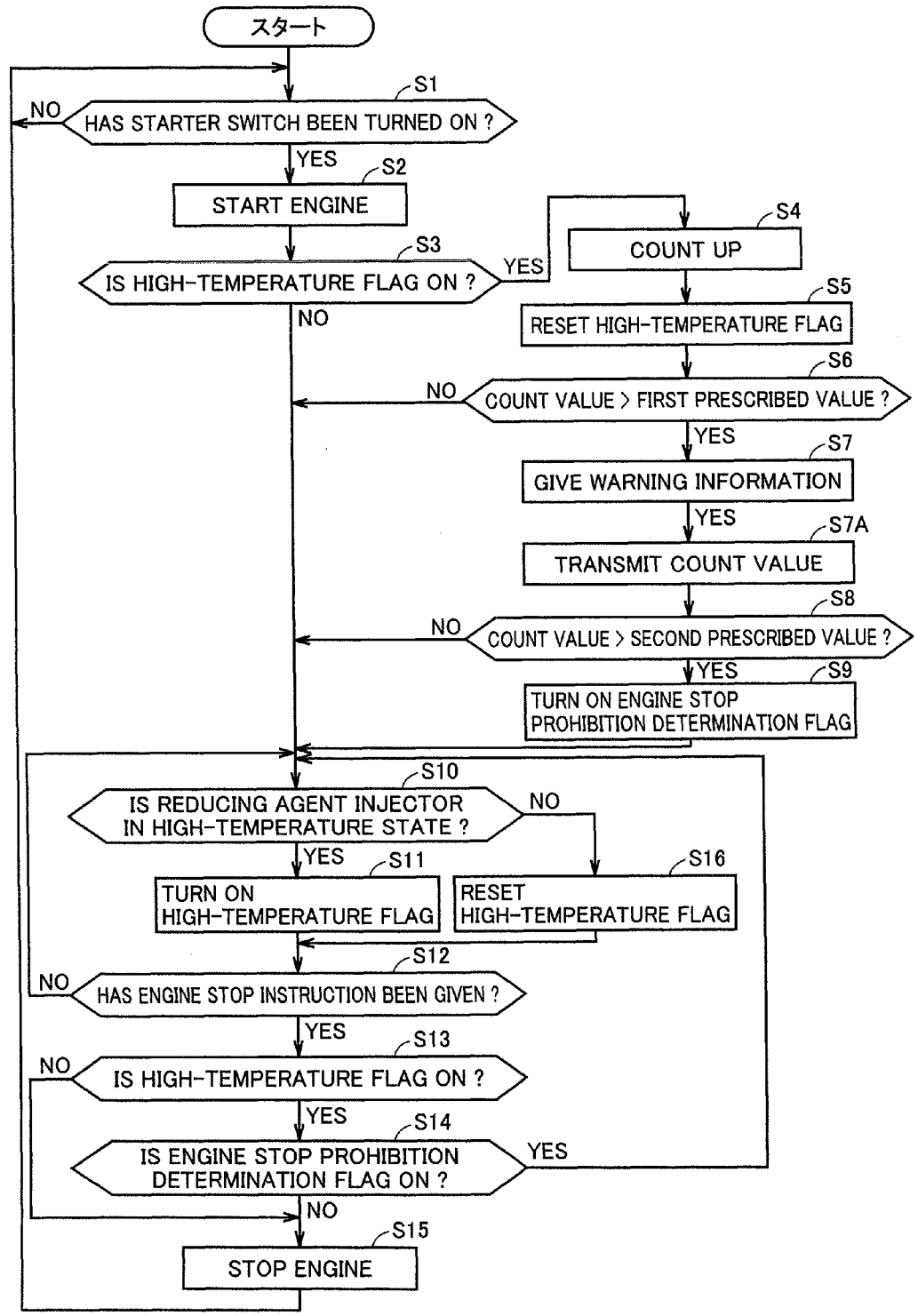
FIG. 13 is a flowchart illustrating a warning function of the control system of work vehicle 101 based on a variation of the first embodiment.

FIG. 13 is a flowchart illustrating a warning function of the control system of work vehicle 101 based on the variation of the first embodiment.

As shown in FIG. 13, addition of step S7A is different from the flowchart in FIG. 9. Since the configuration is otherwise the same as described above, detailed description thereof will not be repeated.

When it is determined in step S7 that a count value has exceeded the first prescribed value (YES in step S6), warning information is given (step S7).

Then, the count value is transmitted (step S7A). Specifically, warning portion 53 instructs communication portion 95 to transmit the count value of counter 58 to management server 200. Communication portion 95 carries out transmission to communication portion 202 of management server 200 in response to the instruction.

Then, in step S8, whether or not a count value has exceeded the second prescribed value is determined (step S8). Since subsequent processing is the same, detailed description thereof will not be repeated.

Since work vehicle 101 can transmit the count value to management server 200 when the count value has exceeded the first prescribed value in the present example, management server 200 can accurately grasp a degree of load imposed on reducing agent injector 84 of work vehicle 101.

Thus, for example, communication control unit 204 may perform analysis processing or the like based on the received information on counter 58 (count value) and analyze a degree of load in further detail, and a management server 200 side may give other warning information to work vehicle 101 through communication portion 202.

In addition, in a case that a plurality of work vehicles 101 are provided, management server 200 can obtain information on counter 58 from each work vehicle 101, so that variation in degree of load or a status of load on reducing agent injector 84 or the like can be analyzed and information obtained based on a result of analysis can be made use of as information for protection of devices in reducing agent injector 84.

Though a scheme that communication portion 95 transmits the count value to management server 200 when the count value has exceeded the first prescribed value has been described in the present example, limitation to that case is not particularly intended, and communication portion 95 may transmit information on counter 58 to management server 200 in coordination with count-up of the count value. In that case, management server 200 can recognize the count value of counter 58 in synchronization with work vehicle 101. Therefore, the management server 200 side may determine whether or not the count value has exceeded the first prescribed value, and when it determines that the count value has exceeded the first prescribed value, the management server 200 side may transmit warning information to work vehicle 101 through communication portion 202 for display. Since the management server 200 side makes determination or the like for display of warning information, such a configuration has the advantage that processing load on work vehicle 101 can be mitigated and necessity for change in contents in message display or the like due to upgrading, function expansion, or the like can readily be addressed.

Second Embodiment

In the first embodiment above, a scheme that, in a case that an instruction to stop engine 36 is given, stop prohibition portion 56 prevents stop of engine 36 when the high-temperature flag indicating a temperature state of reducing agent injector 84 is determined as "on" and the engine stop prohibition determination flag is determined as "on" has been described.

Stop of engine 36 is not based only on an instruction involved with a key operation by an operator, and engine 36 may be stopped also based on other states.

Recently, for energy saving or environmental conservation, incorporation of an idle reduction function in such a work vehicle as a hydraulic excavator has been demanded. The idle reduction function refers to a function to automatically stop an engine when an idling state of a work vehicle has continued for a prescribed time period. The idling state means a state that a work vehicle stands by while an engine remains operating. Engine 36 could also stop owing to the idle reduction function.

In the present example, a scheme preventing engine 36 from stopping with the idle reduction function based on a state of reducing agent injector 84 will be described.

<Functional Block Diagram>

Figure 14:
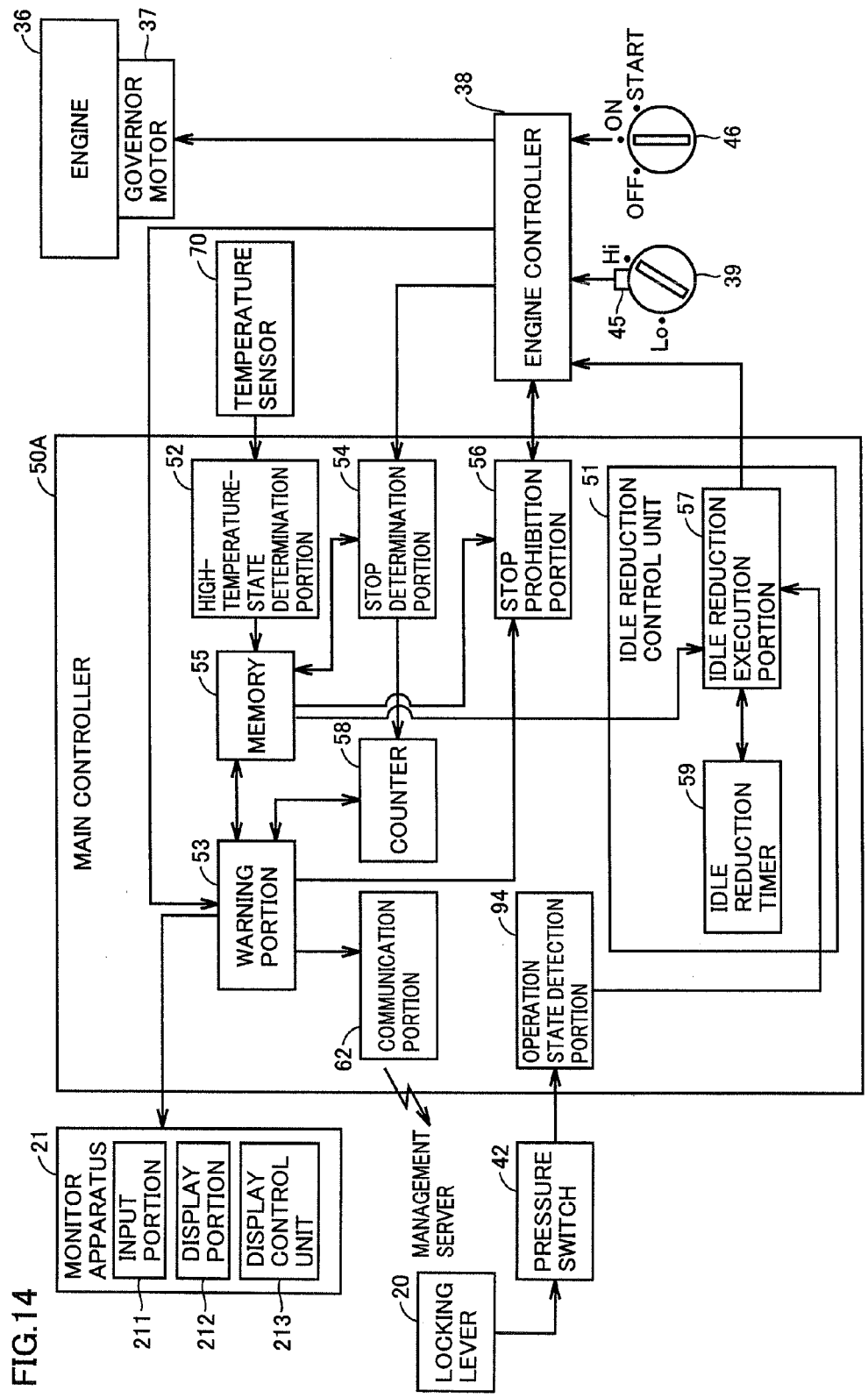
FIG. 14 is a functional block diagram illustrating a main controller 50A in the control system of work vehicle 101 based on a second embodiment.

FIG. 14 is a functional block diagram illustrating a main controller 50A in the control system of work vehicle 101 based on a second embodiment.

As shown in FIG. 14, main controller 50A further includes an operation state detection portion 94 and an idle reduction control unit 51, as compared with main controller 50. In addition, a case that pressure switch 42 and locking lever 20 are further provided as other peripheral devices is shown.

Pressure switch 42 is connected to locking lever 42, and when locking lever 20 is operated to a locking side, it senses that operation.

Operation state detection portion 94 detects a state of pressure switch 42.

Idle reduction control unit 51 controls an idle reduction operation.

Idle reduction control unit 51 includes an idle reduction timer 59 and an idle reduction execution portion 57.

Idle reduction execution portion 57 outputs an engine stop signal to engine controller 38 such that an idle reduction operation for stopping engine 36 is performed when a prescribed condition is satisfied. The "idle reduction operation" refers to an operation for stopping engine 36 in a state in which the work vehicle stands by while engine 36 remains operating. This prescribed condition is a performance condition for performing the "idle reduction operation," and it mainly refers to a condition relating to a prescribed time period during which the idling state of the work vehicle continues. In the present example, the "prescribed time period" is also referred to as an idle reduction time period.

Idle reduction execution portion 57 operates in response to an instruction from operation state detection portion 94, and operates idle reduction timer 59 based on a status of the high-temperature flag and the engine stop prohibition determination flag with reference to memory 55 in response to the instruction from operation state detection portion 94.

Idle reduction timer 59 is a timer counting time in response to an instruction from idle reduction execution portion 57. Then, it outputs a result of counting to idle reduction execution portion 57. Idle reduction execution portion 57 determines whether or not an idle reduction time period has elapsed based on a result of counting (a timer value) counted by idle reduction timer 59, and when it has determined that the idle reduction time period has elapsed, it outputs an engine stop signal to engine controller 38. Engine controller 38 instructs governor motor 37 to stop engine 36, in response to the engine stop signal from idle reduction execution portion 57.

Idle reduction execution portion 57 in the present example does not operate idle reduction timer 59 when the high-temperature flag is "on" and the engine stop prohibition determination flag is "on". Thus, an idle reduction operation can be prevented from starting.

It is noted that idle reduction execution portion 57 represents one example of the "idle reduction execution portion" in the present invention.

<Flow Processing>

Figure 15:
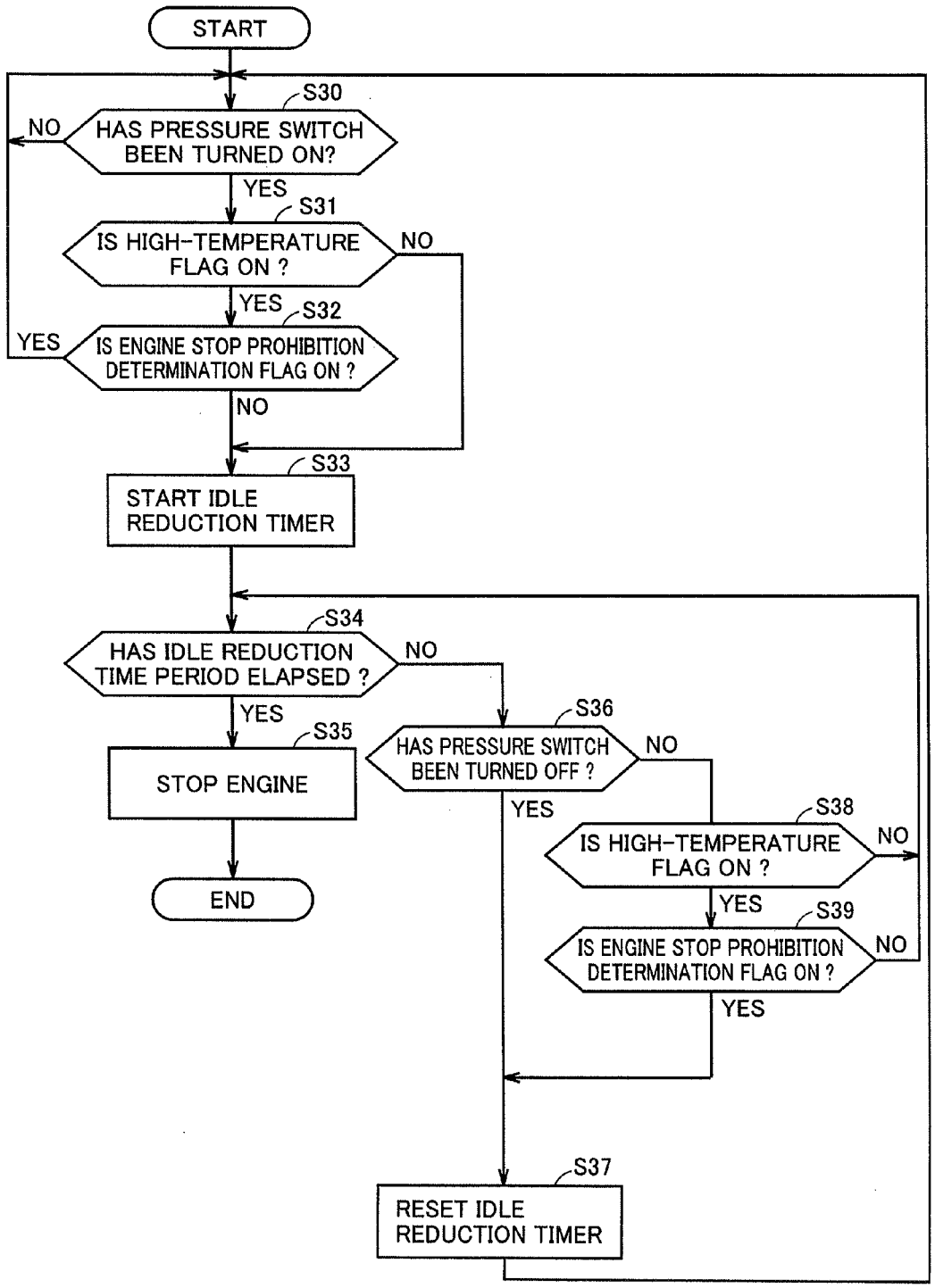
FIG. 15 is a flowchart of idle reduction control processing in an idle reduction control unit 51 based on the second embodiment.

FIG. 15 is a flowchart of idle reduction control processing in idle reduction control unit 51 based on the second embodiment.

As shown in FIG. 15, idle reduction control unit 51 determines whether or not locking lever 20 has been operated to the locking side and pressure switch 42 has been turned on (ON) (step S30). Specifically, operation state detection portion 94 detects that locking lever 20 has been operated to the locking side and pressure switch 42 has been turned on, and outputs that fact to idle reduction execution portion 57. Idle reduction execution portion 57 determines that pressure switch 42 has been turned on (ON) based on a detection signal input from operation state detection portion 94.

Then, when idle reduction control unit 51 determines that pressure switch 42 has not been turned on (ON) (NO in step S30), the process returns to step S30, and when it determines that pressure switch 42 has been turned on (ON) (YES in step S30), it determines whether or not the high-temperature flag is "on" (step S31). Specifically, idle reduction execution portion 57 determines whether or not the high-temperature flag stored in memory 55 is "on". Here, "on" or "off" of the high-temperature flag stored in memory 55 can be set by high-temperature-state determination portion 52 based on a temperature detected by temperature sensor 70 as described above. Specifically, when high-temperature-state determination portion 52 determines that reducing agent injector 84 is in the high-temperature state, it sets the high-temperature flag stored in the prescribed area of memory 55 to "on", and when it determines that reducing agent injector 84 is not in the high-temperature state, it sets the high-temperature flag to "off".

When idle reduction control unit 51 determines in step S31 that the high-temperature flag is "on" (YES in step S31), it then determines whether or not the engine stop prohibition determination flag is "on" (step S32). Specifically, idle reduction execution portion 57 determines whether or not the engine stop prohibition determination flag stored in memory 55 is "on" with reference to memory 55. Here, "on" of the engine stop prohibition determination flag stored in memory 55 is set by warning portion 53 based on the count value of counter 58 as described above. Specifically, when warning portion 53 determines that the count value of counter 58 has exceeded the second prescribed value, it sets the engine stop prohibition determination flag stored in the prescribed area of memory 55 to "on".

When idle reduction control unit 51 determines in step S32 that the engine stop prohibition determination flag is "on" (YES in step S32), it does not start the idle reduction timer but the process returns to step S30. When the high-temperature flag is "on" and the engine stop prohibition determination flag is "on", an idle reduction operation is not performed. When reducing agent injector 84 is in the high-temperature state and the engine stop prohibition determination flag is "on", idle reduction control unit 51 does not perform the idle reduction operation. By preventing engine 36 of work vehicle 101 from automatically stopping with the idle reduction function and suppressing stop of reducing agent injector 84 in the high-temperature state, devices in reducing agent injector 84 can be protected.

When idle reduction control unit 51 determines in step S31 that the high-temperature flag is not "on" (NO in step S31) or when it determines in step S32 that the engine stop prohibition determination flag is not "on" (NO in step S32), it starts idle reduction timer 59 (step S33). Specifically, idle reduction execution portion 57 instructs idle reduction timer 59 to count time. Then, idle reduction timer 59 outputs the counted timer value to idle reduction execution portion 57.

Then, idle reduction control unit 51 determines whether or not an idle reduction time period has elapsed (step S34). Specifically, idle reduction execution portion 57 determines whether or not time counted by idle reduction timer 59 has exceeded the idle reduction time period.

When idle reduction control unit 51 determines in step S34 that the idle reduction time period has elapsed (YES in step S34), it stops engine 36 (step S35). Specifically, idle reduction execution portion 57 outputs an engine stop signal to engine controller 38. Engine controller 38 thus instructs governor motor 37 to stop engine 36.

Then, idle reduction control unit 51 ends the process (end).

On the other hand, when idle reduction control unit 51 determines in step S34 that the idle reduction time period has not elapsed (NO in step S34), it determines whether or not pressure switch 42 has been turned off (OFF) (step S36). Specifically, operation state detection portion 94 detects turn-off (OFF) of pressure switch 42 and outputs to idle reduction execution portion 57, a detection signal indicating turn-off (OFF) of pressure switch 42. Then, idle reduction execution portion 57 determines that pressure switch 42 has been turned off based on input of the detection signal from operation state detection portion 94.

When idle reduction control unit 51 determines in step S36 that pressure switch 42 has been turned off (OFF) (YES in step S36), it resets idle reduction timer 59 (step S37). Specifically, idle reduction execution portion 57 stops count of time by idle reduction timer 59 based on input of a detection signal and resets the count value.

Then, the process returns to step S30 and idle reduction control unit 51 stands by until pressure switch 42 is again turned on (ON).

When idle reduction control unit 51 determines in step S36 that pressure switch 42 has not been turned off (OFF) (NO in step S36), it determines whether or not the high-temperature flag is "on" (step S38). Specifically, idle reduction execution portion 57 determines whether or not the high-temperature flag stored in memory 55 is "on".

When idle reduction control unit 51 determines in step S38 that the high-temperature flag is "on" (YES in step S38), it then determines whether or not the engine stop prohibition determination flag is "on" (step S39). Specifically, idle reduction execution portion 57 determines whether or not the engine stop prohibition determination flag stored in memory 55 is "on" with reference to memory 55.

When idle reduction control unit 51 determines in step S39 that the engine stop prohibition determination flag is "on" (YES in step S39), it resets idle reduction timer 59 (step S37). Specifically, idle reduction execution portion 57 stops count of time by idle reduction timer 59 based on input of a detection signal and resets the count value.

The, the process returns to step S30 and idle reduction control unit 51 repeats the processing above.

When idle reduction control unit 51 determines in step S38 that the high-temperature flag is not "on" (NO in step S38) or determines in step S39 that the engine stop prohibition determination flag is not "on" (NO in step S39), the process returns to step S34 and idle reduction control unit 51 stands by until the idle reduction time period elapses.

Then, when idle reduction control unit 51 determines in step S34 that the idle reduction time period has elapsed (YES in step S34), it stops engine 36 (step S35). Specifically, idle reduction execution portion 57 outputs an engine stop signal to engine controller 38. Engine controller 38 thus instructs governor motor 37 to stop engine 36.

Then, idle reduction control unit 51 ends the process (end).

In the process, when it is determined that the high-temperature flag indicating a temperature state of reducing agent injector 84 is "on" and the engine stop prohibition determination flag is "on", the idle reduction function can be inactivated to thereby prevent engine 36 from automatically stopping. When a temperature of reducing agent injector 84 decreases and reducing agent injector 84 is no longer in the high-temperature state (a state that the high-temperature flag is "off"), engine 36 can be stopped. Thus, load imposed on reducing agent injector 84 can be suppressed.

Though a hydraulic excavator has been described by way of example of a work vehicle in the present example, application also to such a work vehicle as a bulldozer or a wheel loader is possible, and application to any work machine provided with engine 36 is possible.

Though the embodiments of the present invention have been described above, it should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST 1 lower carrier; 2 revolving mechanism; 2a assembly; 3 upper revolving unit; 4 work implement; 5 boom; 6 arm; 7 bucket; 8 operator's cab; 9 operator's seat; 10 travel operation portion; 11, 12 travel lever; 13, 14 travel pedal; 15 pedal for attachment; 16 side window; 17 dashboard; 18, 19 work implement lever; 20 locking lever; 21 monitor apparatus; 22 front window; 23 vertical frame; 31A first hydraulic pump; 31B second hydraulic pump; 32 swash plate drive apparatus; 33 pump controller; 34 control valve; 35 hydraulic actuator; 36 engine; 37 governor motor; 38 engine controller; 39 fuel dial; 40 rotation sensor; 41 work implement lever apparatus; 42 pressure switch; 43 valve; 45 potentiometer; 46 starter switch; 47 pressure sensor; 50, 50A main controller; 51 idle reduction control unit; 52 high-temperature-state determination portion; 53 warning portion; 54 stop determination portion; 55 memory; 56 stop prohibition portion; 57 idle reduction execution portion; 58 counter; 59 idle reduction timer; 60 radiator; 61 cooling pump; 62 exhaust purification unit; 62A diesel oxidation catalyst apparatus; 62B diesel particulate filter apparatus; 64 mixing piping; 65 selective catalytic reduction apparatus; 66 flue; 67 cooling piping; 68 reducing agent injection valve; 69 reducing agent tank; 70 temperature sensor; 71 plate; 72 vertical frame; 73 horizontal frame; 74 bracket; 75 body frame; 82 reducing agent supply pump; 83 reducing agent piping; 84 reducing agent injector; 92, 93 coolant piping; 94 operation state detection portion; 95, 202 communication portion; 101 work vehicle; 111 deceleration switch; 112 operation mode selection switch; 113 travel speed gear selection switch; 114 buzzer cancellation switch; 115 wiper switch; 116 washer switch; 117 air-conditioner switch; 200 management server; 204 communication control unit; 211 input portion; 212 display portion; and 213 display control unit.

The invention claimed is:

1. A work vehicle, comprising:
an engine;
an injector injecting a reducing agent to an exhaust gas exhausted from said engine;
a display;
a determination portion determining whether a temperature of said injector is high;
a stop determination portion determining whether said engine has stopped when said injector is determined to be in a high-temperature state as a result of determination by said determination portion;
a counter counting the number of times of stop of said engine when said injector is determined to be in the high-temperature state based on a result of determination by said stop determination portion; and
a warning portion giving a warning on the display in connection with stop of said engine when a count value of said counter exceeds a first prescribed value.

2. The work vehicle according to claim 1, wherein
said warning portion gives said warning when said engine starts.

3. The work vehicle according to claim 1, further comprising a communication portion transmitting information on said counter to an external apparatus provided to be able to communicate with said work vehicle.

4. The work vehicle according to claim 1, further comprising a collection apparatus collecting a particulate matter, which is provided upstream of said injector, wherein
said determination portion determines whether said injector is in the high-temperature state based on at least any one of a temperature of the exhaust gas which has passed through said collection apparatus and a temperature of said injector.

5. The work vehicle according to claim 1, further comprising:
a cooling apparatus for cooling said injector during operation of said engine; and
an idle reduction execution portion capable of stopping said engine in an idling state, wherein
said idle reduction execution portion does not stop said engine in said idling state when said determination portion determines that said injector is in the high-temperature state when said counter exceeds a second prescribed value greater than said first prescribed value.

6. The work vehicle according to claim 1, further comprising:
a cooling apparatus for cooling said injector during operation of said engine; and
a stop prohibition portion prohibiting stop of said engine when said determination portion determines that said injector is in the high-temperature state when the count value of said counter exceeds a second prescribed value greater than said first prescribed value.

7. The work vehicle according to claim 6, wherein
said cooling apparatus operates based on motive power from said engine.

8. A work vehicle, comprising:
an engine;
an injector injecting a reducing agent to an exhaust gas exhausted from said engine;
a display; and
a controller programmed to execute:
a determination unit configured to determine whether a temperature of said injector is high;
a stop determination unit configured to determine whether said engine has stopped when said injector is determined to be in a high-temperature state as a result of determination by said determination unit;
a counter counting the number of times of stop of said engine when said injector is determined to be in the high-temperature state based on a result of determination by said stop determination unit; and
a warning unit configured to give a warning on the display in connection with stop of said engine when a count value of said counter exceeds a first prescribed value.

9. The work vehicle according to claim 8, further comprising a collection apparatus collecting a particulate matter, which is provided upstream of said injector, wherein
said determination unit determines whether said injector is in the high-temperature state based on at least any one of a temperature of the exhaust gas which has passed through said collection apparatus and a temperature of said injector.

10. The work vehicle according to claim 8, further comprising:
a cooling apparatus for cooling said injector during operation of said engine; and
wherein the controller is further programmed to execute:
an idle reduction execution unit capable of stopping said engine in an idling state, wherein
said idle reduction execution unit does not stop said engine in said idling state when said determination unit determines that said injector is in the high-temperature state when said count value exceeds a second prescribed value greater than said first prescribed value.

11. The work vehicle according to claim 8, wherein the controller is further programmed to execute:
a communication unit configured to transmit information on said counter to an external apparatus provided to be able to communicate with said work vehicle.

12. The work vehicle according to claim 8, wherein
said warning unit gives said warning when said engine starts.

13. The work vehicle according to claim 8, further comprising:
a cooling apparatus for cooling said injector during operation of said engine; and
wherein the controller is further programmed to execute:
a stop prohibition unit configured to prohibit stop of said engine when said determination unit determines that said injector is in the high-temperature state when the count value of said counter exceeds a second prescribed value greater than said first prescribed value.

14. The work vehicle according to claim 13, wherein
said cooling apparatus operates based on motive power from said engine.

* * * * *